(12) United States Patent
Pan et al.

(10) Patent No.: US 9,908,995 B2
(45) Date of Patent: Mar. 6, 2018

(54) MULTIFUNCTIONAL GRAPHENE-SILICONE ELASTOMER NANOCOMPOSITE, METHOD OF MAKING THE SAME, AND USES THEREOF

(71) Applicant: The Trustees of Princeton University, Princeton, NJ (US)

(72) Inventors: Shuyang Pan, Southgate, MI (US); Ilhan A. Aksay, Princeton, NJ (US); Robert K. Prud'Homme, Lawrenceville, NJ (US)

(73) Assignee: The Trustees of Princeton University, Princeton, NJ (US)

( * ) Notice: Subject to any disclaimer, the term of this patent is extended or adjusted under 35 U.S.C. 154(b) by 23 days.

(21) Appl. No.: 15/225,946

(22) Filed: Aug. 2, 2016

(65) Prior Publication Data

US 2016/0340495 A1 Nov. 24, 2016

Related U.S. Application Data

(63) Continuation of application No. 12/945,043, filed on Nov. 12, 2010, now Pat. No. 9,441,076.

(60) Provisional application No. 61/260,538, filed on Nov. 12, 2009.

(51) Int. Cl.
*C08K 9/00* (2006.01)
*B82Y 30/00* (2011.01)
*C08G 77/16* (2006.01)
*C08G 77/18* (2006.01)
*C08G 77/20* (2006.01)
*C08L 83/04* (2006.01)
*C08G 77/08* (2006.01)
*C08G 77/38* (2006.01)
*C08J 3/205* (2006.01)

(52) U.S. Cl.
CPC ............... *C08K 9/00* (2013.01); *B82Y 30/00* (2013.01); *C08G 77/08* (2013.01); *C08G 77/16* (2013.01); *C08G 77/18* (2013.01); *C08G 77/20* (2013.01); *C08G 77/38* (2013.01); *C08J 3/2053* (2013.01); *C08L 83/04* (2013.01); *C08J 2383/07* (2013.01)

(58) Field of Classification Search
CPC ................. C08G 77/20; B82Y 30/00
See application file for complete search history.

(56) References Cited

U.S. PATENT DOCUMENTS

| | | |
|---|---|---|
| 3,419,593 A | 12/1968 | Willing |
| 7,658,901 B2 | 2/2010 | Prud'Homme et al. |
| 7,659,350 B2 | 2/2010 | Prud'Homme et al. |
| 7,745,528 B2 | 6/2010 | Prud'Homme et al. |
| 7,771,824 B2 | 8/2010 | Herrera-Alonso et al. |
| 7,935,754 B2 | 5/2011 | Prud'Homme et al. |
| 8,449,959 B2 | 5/2013 | Aksay et al. |
| 2007/0092432 A1* | 4/2007 | Prud'Homme ........ H01G 4/206 423/448 |
| 2008/0302561 A1 | 12/2008 | Prud'Homme et al. |
| 2008/0312368 A1 | 12/2008 | Prud'Homme et al. |
| 2009/0053433 A1 | 2/2009 | Prud'Homme et al. |
| 2009/0053437 A1 | 2/2009 | Prud'Homme et al. |
| 2009/0054272 A1 | 2/2009 | Prud'Homme et al. |
| 2009/0054581 A1 | 2/2009 | Prud'Homme et al. |
| 2009/0123752 A1 | 5/2009 | Prud'Homme et al. |
| 2009/0123843 A1 | 5/2009 | Aksay et al. |
| 2009/0127514 A1 | 5/2009 | Korkut et al. |
| 2009/0233057 A1 | 9/2009 | Aksay et al. |
| 2010/0096595 A1 | 4/2010 | Prud'Homme et al. |
| 2011/0042813 A1 | 2/2011 | Crain et al. |
| 2011/0049437 A1 | 3/2011 | Crain et al. |
| 2011/0052476 A1 | 3/2011 | Prud'Homme et al. |
| 2011/0114897 A1 | 5/2011 | Aksay et al. |
| 2012/0145234 A1 | 6/2012 | Roy-Mayhew et al. |
| 2012/0237749 A1 | 9/2012 | Aksay et al. |
| 2012/0244333 A1 | 9/2012 | Aksay et al. |
| 2013/0302588 A1 | 11/2013 | Aksay et al. |
| 2015/0155404 A1 | 6/2015 | Roy-Mayhew et al. |
| 2015/0173188 A1 | 6/2015 | Prud'Homme et al. |
| 2015/0218392 A1 | 8/2015 | Crain et al. |

FOREIGN PATENT DOCUMENTS

| | | | |
|---|---|---|---|
| WO | 2007 092118 | 8/2007 | |
| WO | WO-2007092118 A2 * | 8/2007 | ................ C08J 5/18 |
| WO | 2009 134492 | 11/2009 | |

* cited by examiner

*Primary Examiner* — Kuo Liang Peng
(74) *Attorney, Agent, or Firm* — Oblon, McClelland, Maier & Neustadt, L.L.P.

(57) ABSTRACT

A nanocomposite composition having a silicone elastomer matrix having therein a filler loading of greater than 0.05 wt %, based on total nanocomposite weight, wherein the filler is functional graphene sheets (FGS) having a surface area of from 300 m$^2$/g to 2630 m$^2$/g; and a method for producing the nanocomposite and uses thereof.

20 Claims, 11 Drawing Sheets

(11 of 11 Drawing Sheet(s) Filed in Color)

*FIG. 8A*
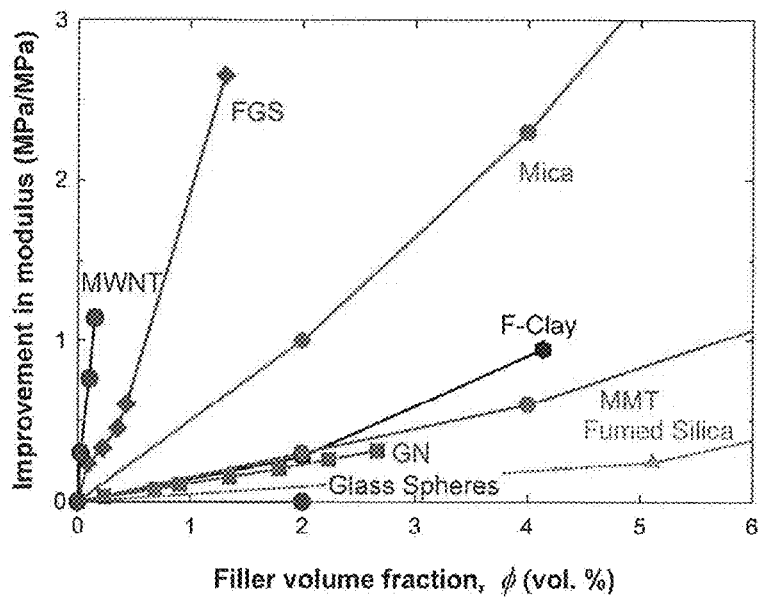
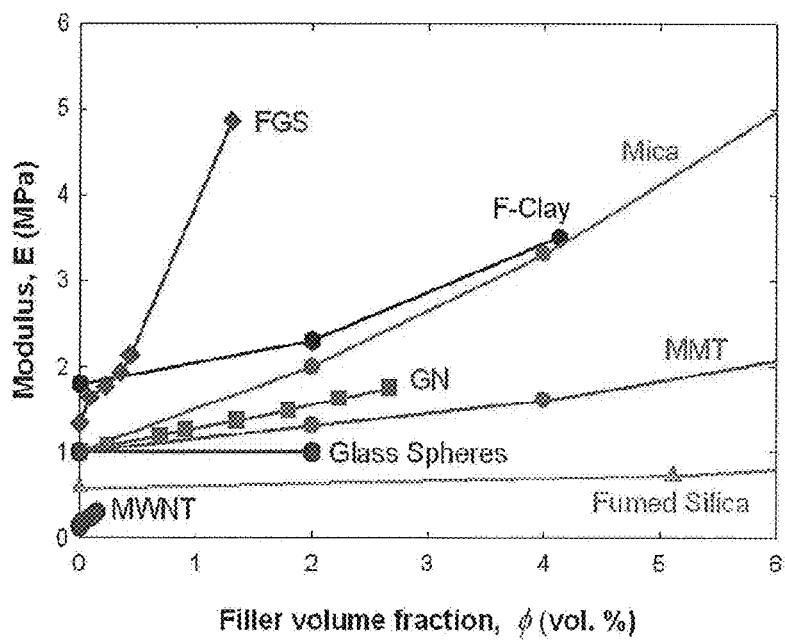
*FIG. 8B*

*FIG. 9A*
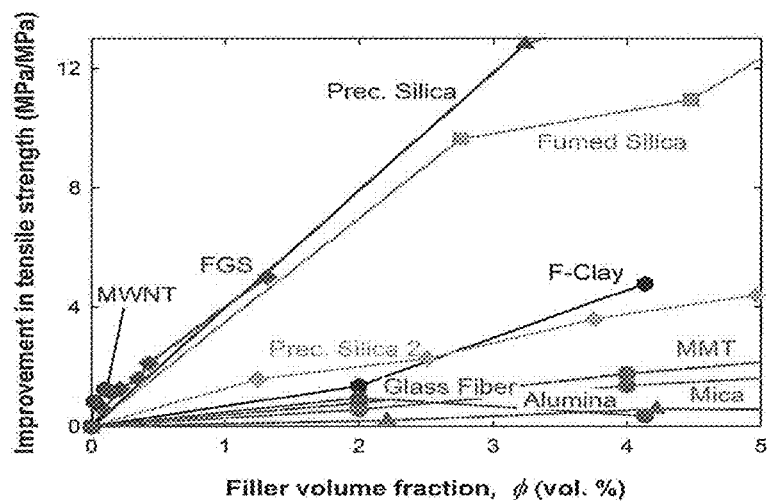
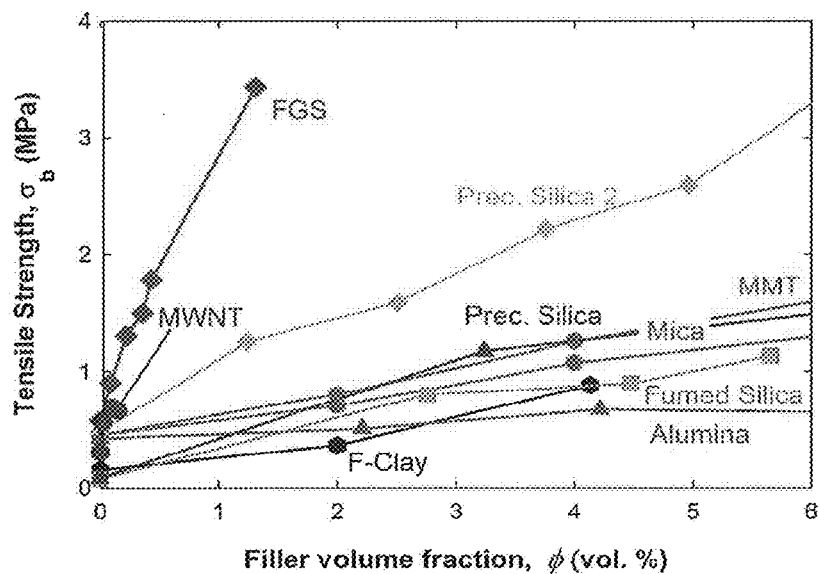
*FIG. 9B*

MULTIFUNCTIONAL GRAPHENE-SILICONE ELASTOMER NANOCOMPOSITE, METHOD OF MAKING THE SAME, AND USES THEREOF

REFERENCE TO RELATED APPLICATIONS

The present application is a Continuation of U.S. application Ser. No. 12/945,043, filed Nov. 12, 2010, now allowed, and also claims priority on U.S. Provisional Application Ser. No. 61/260,538, filed Nov. 12, 2009, the entire contents of each of which are hereby incorporated by reference.

This invention was made with government support under Grant No. CMS-0609049 awarded by the National Science Foundation. The Government has certain rights in the invention. The invention described herein was also made in the performance of work under a NASA contract (No. NNL08AF34P) and is subject to the provisions of Public Law 96-517 (35 USC 202) in which the Contractor has elected to retain title.

BACKGROUND OF THE INVENTION

Field of the Invention

The present invention relates to nanocomposites having a matrix of silicone elastomer with multifunctional graphene sheets as filler, methods of making the same and their use.

Description of the Related Art

The effect of filler dispersion on the mechanical properties of the resulting composite has been studied for decades but a consensus is yet to be reached. Many have suggested that maximizing filler dispersion is crucial in achieving good mechanical properties. For example, for carbon nanotubes (CNT), Ajayan et al. suggested that load transfer can be limited when the nanotubes are slipping within the bundles.[1] The bundles need to be broken into individual dispersed tube segments to obtain effective modulus increase and strengthening. Schandler et al. have proposed that infiltrating the polymer into the interstices of the nanotube bundles can create effective load transferring and therefore mechanical reinforcement.[2] Similarly for inorganic fillers, Lebaron et al. have suggested that the complete dispersion of clay optimized the number of reinforcing elements for carrying an applied load and deflecting cracks, allowing for tensile property improvements.[3]

[1] Ajayan, P. M.; Schadler, L. S.; Giannaris, C.; Rubio, A. *Advanced Materials* 2000, 12, (10), 750
[2] Schadler, L. S. Giannaris, S. C.; Ajayan, P. M. *Applied Physics Letters* 1998, 73, (26), 3842-3844
[3] LeBaron, P. C.; Wang, Z.; Pinnavaia, T. J. *Applied Clay Science* 1999, 15, (1-2), 11-29

Large clusters of particles can act as flaws to initiate premature termination of stretching.[4] On the other hand, it has long been suggested in the automotive tire industry that aggregated fillers are more effective than primary particles in enhancing the modulus and tensile strength of the elastomer.[5] At large strains, the deformation and irreversible breakdown of aggregates absorb energy, allowing the composite to tolerate higher amounts of stress. However, a rigorous understanding of the effect of breaking up initial filler agglomerates on the mechanical properties that incorporates the two aforementioned contrasting views, is lacking.

[4] Wilbrink, M. W. L.; Argon, A. S.; Cohen, R. E.; Weinberg, M. *Polymer* 2001, 42, (26), 10155-10180
[5] Poovarodom, S.; Hosseinpour, D.; Berg, J. C. *Industrial & Engineering Chemistry Research* 2008, 47, (8), 2623-2629

In achieving the maximum effect with the minimum filler loading, it is important to understand the correlation between the spatial distribution of dispersed fillers and the macroscopic mechanical properties of the composite.[6,7] Some understanding of the structure-property relationship has been developed previously by others. A larger agglomeration of silica renders a better improvement in the Young's modulus of the matrix.[8] It has been shown by Akcora et al. that self-assembled nanoparticle sheet yielded a solid-like rheological behavior in polystyrene whereas well-dispersed short particle strings did not.[9] However, the effect of filler assembly on the tensile properties of the composites is not yet well-understood.

[6] Vaia, R. A.; Maguire, J. F. *Chemistry of Materials* 2007, 19, (11), 2736-2751
[7] Balazs, A. C.; Emrick, T.; Russell, T. P. *Science* 2006, 314, (5802), 1107-1110
[8] Oberdisse, J. *Soft Matter* 2006, 2, (1), 29-36
[9] Akcora, P.; Liu, H.; Kumar, S. K.; Moll, J.; Li, Y.; Benicewicz, B. C.; Schadler, L. S.; Acehan, D.; Panagiotopoulos, A. Z.; Pryamitsyn, V.; Ganesan, V.; Ilavsky, J.; Thiyagarajan, P.; Colby, R. H.; Douglas, J. F. *Nature Materials* 2009, 8, (4), 354-U121

Another fundamental issue that has drawn much attention is the origin of the reinforcements of tensile properties in composites. Simultaneous improvements in modulus, strength and elongation at break with the incorporation of fillers have been observed in poly(methylmethacrylate),[10] epoxy,[11] styrene-butadiene rubber,[12] polyimide,[13] and silicone rubber.[14,15,16,17,18] While the modulus and strength increase with the filler concentration, the elongation at break in some cases increases initially and then decreases above a critical filler concentration.[11,13, 16,17]

[10] Sui, X. M.; Wagner, H. D. *Nano Letters* 2009, 9, (4), 1423-1426
[11] Tseng, C. H.; Wang, C. C.; Chen, C. Y. *Chemistry of Materials* 2007, 19, (2), 308-315
[12] Bokobza, L.; Rahmani, M.; Belin, C.; Bruneel, J. L.; El Bounia, N. E. *Journal Of Polymer Science Part B-Polymer Physics* 2008, 46, (18), 1939-1951
[13] An, L.; Pan, Y. Z.; Shen, X. W.; Lu, H. B.; Yang, Y. L. *Journal of Materials Chemistry* 2008, 18, (41), 4928-4941
[14] Aranguren, M. I.; Mora, E.; Macosko, C. W.; Saam, J. *Rubber Chemistry And Technology* 1994, 67, (5), 820-833
[15] Yuan, Q. W.; Mark, J. E. *Macromolecular Chemistry And Physics* 1999, 200, (1), 206-220
[16] Osman, M. A.; Atallah, A.; Muller, M.; Suter, U. W. *Polymer* 2001, 42, (15), 6545-6556
[17] Bokobza, L.; Rahmani, M. *Kgk-Kautschuk Gummi Kunststoffe* 2009, 62, (3), 112-117
[18] LeBaron, P. C.; Pinnavaia, T. J. *Chemistry Of Materials* 2001, 13, (10), 3760-3765

The increase in modulus is attributed to load transferring to the stiffer filler material.[19,20] Some understanding has been achieved in the tensile strength and elongation at break increase. Sui et al. demonstrated using transmission electron microscopy (TEM) the mechanism responsible for the significant elongation at break increase in electrospun CNT-poly(methyl methacrylate) (PMMA) fibers.[10] In pure PMMA fiber, sparse and unstable necking was observed along the fiber under tension, followed by failure of the fiber. When 1.5 wt. % single wall carbon nanotubes (SWCNT) were added, multiple necking was initiated but arrested by SWCNT ropes. Further stretching led to bridging by SWCNT ropes, which caused a dilation effect in the fiber and an increase in the elongation at break. The inelastic strain and energy dissipation introduced by the necking and bridging was proposed to explain the tensile strength increase of the nanocomposite. Only one CNT concentration was used. In the same study, millimeter-sized pure and CNT filled PMMA films were studied and improvement in the elongation at break was also observed, although to a lesser extent compared to the electrospun fibers. The improvement in the films was not addressed in the study.

[19] Hashin, Z.; Shtrikman, S. *Journal Of The Mechanics And Physics Of Solids* 1963, 11, (2), 127-140
[20] Nielsen, L. E. *Journal Of Applied Physics* 1970, 41, (11), 4626-&
[10] Sui, X. M.; Wagner, H. D. *Nano Letters* 2009, 9, (4), 1423-1426

Load transferring to CNT has been proposed to explain the strength and elongation at break increase in epoxy.[11] When an amphiphilic block copolymer was incorporated into epoxy, elongation at break increase was observed.[21] The underlying mechanisms were investigated with optical microscopy and TEM. It was found that a 15 nm size spherical block copolymer micelle could cavitate to induce matrix shear banding. It was suggested that the dilation effect and shear banding introduced by the cavitation led to the observed increase in the elongation at break.

[11] Tseng, C. H.; Wang, C. C.; Chen, C. Y. *Chemistry of Materials* 2007, 19, (2), 308-315
[21] Liu, J.; Sue, H. J.; Thompson, Z. J.; Bates, F. S.; Dettloff, M.; Jacob, G.; Verghese, N.; Pham, H. *Macromolecules* 2008, 41, (20), 7616-7624

When rod-like attapulgite was incorporated into polyimide, simultaneous improvements in modulus, strength and elongation at break were observed.[13] The enhancement of the interfacial stress transfer and the resistance to crack propagation induced by attapulgite was proposed to explain the mechanical reinforcement.

[13] An, L.; Pan, Y. Z.; Shen, X. W.; Lu, H. B.; Yang, Y. L. *Journal of Materials Chemistry* 2008, 18, (41), 4928-4941

Filler agglomerates acting as defects have been proposed to explain the reversal in the elongation at break.[11,22] Incorporation of free volume with the filler has also been suggested to be causing the reversal effect.[13] The addition of filler increased the free volume or defects in nanocomposites and the resistance to crack propagation during deformation. Below the critical concentration, the latter effect dominated and elongation at break increased. Above the threshold, the increase in the number of defects dominated and the elongation at break started to decrease. The reversal effect was also observed with the incorporation of polystyrene-modified cadmium selenide nanoparticles to polystyrene (PS).[23] It was proposed that two competing effects determine the elongation at break of the composite. Nanoparticles entrapped within the mature craze during craze widening disrupt the formation of cross-tie fibrils by increasing the mobility of polymer segments at the craze-bulk interface. Less cross-tie fibrils reduced the premature rupture of the craze fibrils and increased the failure strain. On the other hand, entrapped nanoparticles also reduced the extensibility of the craze fibrils or the dilation effect of the craze. So the two competing effects led to a maximum in elongation at break of the composite as a function of nanoparticle concentrations.

[11] Tseng, C. H.; Wang, C. C.; Chen, C. Y. *Chemistry of Materials* 2007, 19, (2), 308-315
[22] Gorga, R. E.; Cohen, R. E. *Journal of Polymer Science Part B-Polymer Physics* 2004, 42, (14), 2690-2702
[13] An, L.; Pan, Y. Z.; Shen, X. W.; Lu, H. B.; Yang, Y. L. *Journal of Materials Chemistry* 2008, 18, (41), 4928-4941
[23] Lee, J. Y.; Zhang, Q. L.; Wang, J. Y.; Emrick, T.; Crosby, A. J. *Macromolecules* 2007, 40, (17), 6406-6412

The simultaneous improvements are not limited to polymeric matrices. The incorporation of polymeric fibers increased the strength and elongation at break of the newly engineered building material called engineered cementitious composites (ECC).[24] ECCs have been designed to distribute many cracks of small width throughout the composite rather than only a few large cracks seen in traditional concrete failure. Such a distributed deformation is responsible for the observed mechanical reinforcement. Similar mechanisms have been shown to cause the elongation at break increase in biological composites such as nacre.[25]

[24] Li, V. C.; Wang, 5. X.; Wu, C. *Aci Materials Journal* 2001, 98, (6), 483-492
[25] Wang, R. Z.; Suo, Z.; Evans, A. G.; Yao, N.; Aksay, I. A. *Journal Of Materials Research* 2001, 16, (9), 2485-2493

Despite the aforementioned efforts, some fundamental issues governing the tensile properties improvements have not been completely understood. For example, it is not known how the filler agglomeration and filler concentration influence the interaction between fillers and tears or cracks, nor how filler length scale influences the interaction. Further, it is not known how the interaction is related to the reversal effect or how the local deformation is directly correlated with the macroscopic tensile properties in bulk composites. Lastly, it is not known how mechanical load is being transferred to the filler. These are all critical questions that need to be addressed in order to gain a complete understanding of the reinforcement.

One potential filler that has been suggested is functional graphene sheets (FGS). FGS is an atomically thin layer of graphite hundreds of nanometers in the lateral dimension and decorated with carboxyls at the edges and hydroxyls and epoxides on the planes. Our group invented a method to produce functionalized graphene sheet (FGS) on a large scale; see U.S. Patent Application Publication 2007/0092432, filed Oct. 14, 2005 and published Apr. 26, 2007 (the entire contents of which are hereby incorporated by reference; hereafter "the '432 application"). It has a wrinkled geometry with an average aspect ratio of 500 and a surface area from 300 $m^2/g$ to 2630 $m^2/g$, typically up to 1800 $m^2/g$.[26,27] It is preferably produced through thermal exfoliation and reduction of oxidized natural graphite. The '432 application further discloses these FGS products. Stankovich et al. developed an alternative method to produce graphene.[28] Graphene oxide was first obtained by oxidation of natural graphite and sonication of graphite oxide. Chemical reduction of graphene oxide yielded graphene with good electrical conductivity. In a recent study, significant increases in glass transition temperature, Young's modulus, tensile strength and electrical conductivity was observed in when 1 weight % of FGS was incorporated into poly(methyl methacrylate) and poly(acrylonitrile).[29] An enhancement in the modulus and electrical conductivity as well as a reduction in the coefficient of thermal expansion and gas permeability was observed when FGS was added to poly(ethylene-2,6-naphthalate) and poly(carbonate).[30,31] When reduced graphene oxide was incorporated into polystyrene, a low electrical percolation of 0.1 vol. % and good conductivities were obtained.[28]

[26] Schniepp, H. C.; Kudin, K. N.; Li, J. L.; Prud'homme, R. K.; Car, R.; Saville, D. A.; Aksay, I. A. *Acs Nano* 2008, 2, (12), 2577-2584
[27] McAllister, M. J.; Li, J. L.; Adamson, D. H.; Schniepp, H. C.; Abdala, A. A.; Liu, J.; Herrera-Alonso, M.; Milius, D. L.; Car, R.; Prud'homme, R. K.; Aksay, I. A. *Chemistry Of Materials* 2007, 19, (18), 4396-4404
[28] Stankovich, S.; Dikin, D. A.; Dommett, G. H. B.; Kohlhaas, K. M.; Zimney, E. J.; Stach, E. A.; Piner, R. D.; Nguyen, S. T.; Ruoff, R. S. *Nature* 2006, 442, (7100), 282-286
[29] Ramanathan, T.; Abdala, A. A.; Stankovich, S.; Dikin, D. A.; Herrera-Alonso, M.; Piner, R. D.; Adamson, D. H.; Schniepp, H. C.; Chen, X.; Ruoff, R. S.; Nguyen, S. T.; Aksay, I. A.; Prud'homme, R. K.; Brinson, L. C. *Nature Nanotechnology* 2008, 3, (6), 327-331
[30] Kim, H.; Macosko, C. W. *Macromolecules* 2008, 41, (9), 3317-3327
[31] Kim, H.; Macosko, C. W. *Polymer* 2009, 50, (15), 3797-3809

U.S. patent application Ser. No. 11/543,872, filed Oct. 6, 2006 (the entire contents of which are hereby incorporated by reference), discloses the use of the FGS of the '432 application in the production of various nanocomposite rubbers.

SE has attracted both scientific and commercial interest for its thermal stability over a wide range of temperatures (−50 to over 200° C.), retention of elastomeric properties at low temperatures due to a low glass transition temperature of −125° C., its chemical and weathering resistance.[32,33,34] SE is typically made by end-linking poly(dimethyl siloxane) (PDMS) and therefore its molecular weight between crosslinks is well-characterized. Due to its relatively inferior tensile strength in the unfilled state (typically less than 1 MPa, compared to more than 10 MPa of natural rubber), silica is generally used to render SE applicable in commercial applications.[34,34] Other fillers including silica,[14,15,35] clays,[16,16,36] carbon nanotubes (CNT),[17,37] graphite nanosheet,[38] glass fiber,[39] and in-situ precipitated alumina,[40] have also been studied as alternative fillers for SE.

[32] Mark, J. E. *Accounts Of Chemical Research* 2004, 37, (12), 946-953
[33] Noll, W., *Chemistry and Technology of Silicones. Academic Press, Inc.: New York*, 1978
[34] Butts, M.; et. al. In *Kirk-Othmer Encyclopedia of Chemical Technology-Silicones*. Wiley Interscience: New York, 2004
[14] Aranguren, M. I.; Mora, E.; Macosko, C. W.; Saam, J. *Rubber Chemistry And Technology* 1994, 67, (5), 820-833
[15] Yuan, Q. W.; Mark, J. E. *Macromolecular Chemistry And Physics* 1999, 200, (1), 206-220
[35] Mark, J. E.; Jiang, C. Y.; Tang, M. Y. *Macromolecules* 1984, 17, (12), 2613-2616
[16] Osman, M. A.; Atallah, A.; Muller, M.; Suter, U. W. *Polymer* 2001, 42, (15), 6545-6556
[36] Osman, M. A.; Atallah, A.; Kahr, G.; Suter, U. W. *Journal of Applied Polymer Science* 2002, 83, (10), 2175-2183
[17] Bokobza, L.; Rahmani, M. *Kgk-Kautschuk Gummi Kunststoffe* 2009, 62, (3), 112-117
[37] Frogley, M. D.; Ravich, D.; Wagner, H. D. *Composites Science And Technology* 2003, 63, (11), 1647-1654
[38] Chen, L.; Lu, L.; Wu, D. J.; Chen, G. H. *Polymer Composites* 2007, 28, (4), 493-498
[39] Park, E. S. *Journal of Applied Polymer Science* 2007, 105, (2), 460-468
[40] Mark, J. E.; Wang, S. B. *Polymer Bulletin* 1988, 20, (5), 443-448

SUMMARY OF THE INVENTION

Accordingly, one object of the present invention is to provide a nanocomposite based on silicone elastomers that has one or more of higher modulus, strength, failure strain, electrical conductivity and lower gas permeability than the unfilled silicone elastomer.

A further object of the present invention is to provide a method for producing such a nanocomposite.

A further object of the present invention is to provide articles made from the nanocomposite, including, but not limited to electrically conductive and low-permeability coating, adhesive and sealants, as well as flexible electrodes, actuators, pressure sensor, printed circuits and electromagnetic interference shielding material.

These and other objects of the present invention, either alone or in combinations thereof, have been satisfied by the discovery of a nanocomposite composition comprising:
a silicone elastomer matrix having therein a filler loading of greater than 0.05 wt %, based on total nanocomposite weight;
wherein the filler is functional graphene sheets (FGS) having a surface area of from 300 m$^2$/g to 2630 m$^2$/g;
a method for producing the nanocomposite composition and its use in a variety of end products.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

A more complete appreciation of the invention and many of the attendant advantages thereof will be readily obtained as the same becomes better understood by reference to the following detailed description when considered in connection with the accompanying drawings, wherein:

FIGS. 8A and 8B provide graphical representations of a comparison of FGS with other fillers in the modulus of the composite and the improvement in the modulus.[14,16,17,18,36,38]

[14] Aranguren, M. I.; Mora, E.; Macosko, C. W.; Saam, J. *Rubber Chemistry And Technology* 1994, 67, (5), 820-833
[16] Osman, M. A.; Atallah, A.; Muller, M.; Suter, U. W. *Polymer* 2001, 42, (15), 6545-6556
[17] Bokobza, L.; Rahmani, M. *Kgk-Kautschuk Gummi Kunststoffe* 2009, 62, (3), 112-117
[18] LeBaron, P. C.; Pinnavaia, T. J. *Chemistry Of Materials* 2001, 13, (10), 3760-3765
[36] Osman, M. A.; Atallah, A.; Kahr, G.; Suter, U. W. *Journal of Applied Polymer Science* 2002, 83, (10), 2175-2183
[38] Chen, L.; Lu, L.; Wu, D. J.; Chen, G. H. *Polymer Composites* 2007, 28, (4), 493-498

FIGS. 9A and 9B provide graphical representations of a comparison of FGS with other fillers in the tensile strength of the composite and the improvement in tensile strength rendered by the filler.[14-18,36,39,40]

[14] Aranguren, M. I.; Mora, E.; Macosko, C. W.; Saam, J. *Rubber Chemistry And Technology* 1994, 67, (5), 820-833
[18] LeBaron, P. C.; Pinnavaia, T. J. *Chemistry Of Materials* 2001, 13, (10), 3760-3765
[36] Osman, M. A.; Atallah, A.; Kahr, G.; Suter, U. W. *Journal of Applied Polymer Science* 2002, 83, (10), 2175-2183
[39] Park, E. S. *Journal of Applied Polymer Science* 2007, 105, (2), 460-468
[40] Mark, J. E.; Wang, S. B. *Polymer Bulletin* 1988, 20, (5), 443-448

Figure 10:
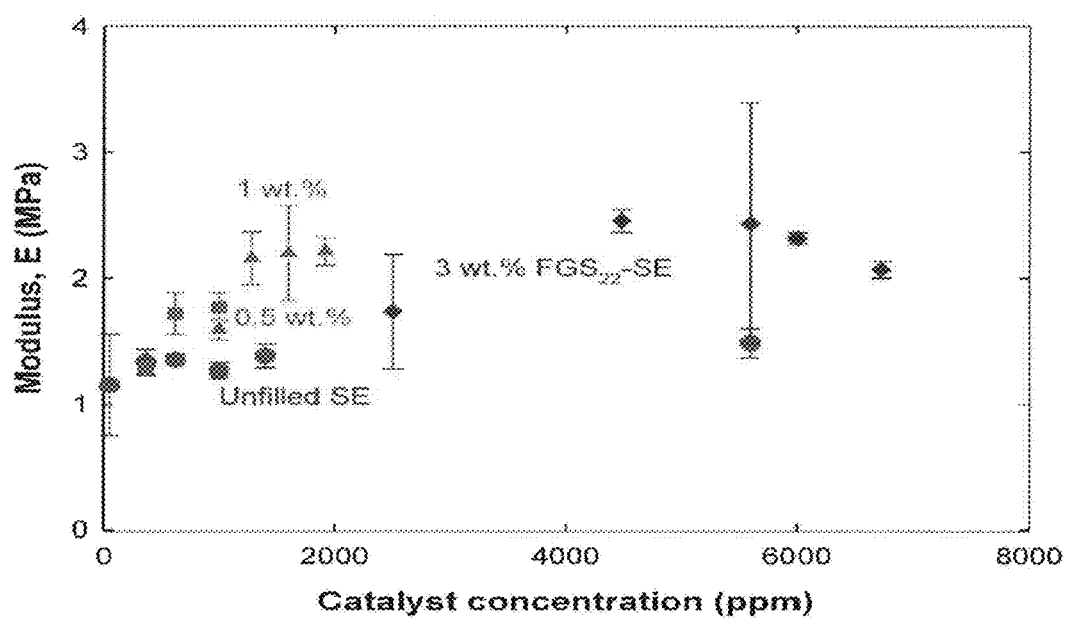

FIG. 10 provides a graphical representation of the effect of catalyst concentration on the modulus of SE at r=1.5 for all samples.

Figure 11:
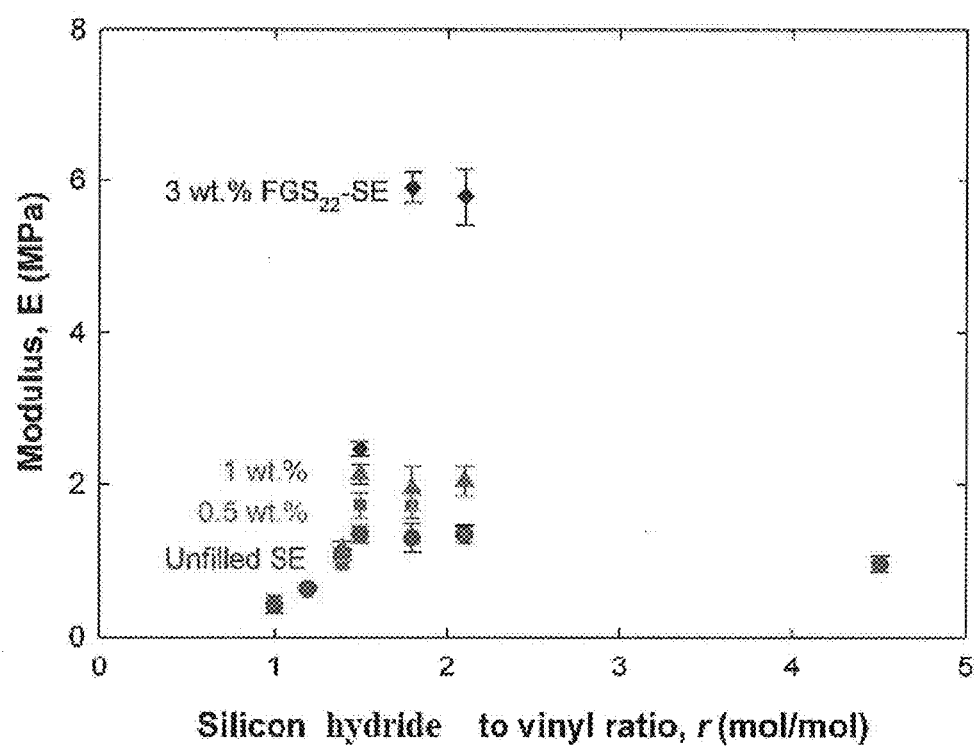

FIG. 11 provides a graphical representation of the effect of silicon hydride to vinyl ratio on the modulus of FGS-SE nanocomposite.

DETAILED DESCRIPTION OF THE PREFERRED EMBODIMENTS

The present invention involves the addition of functionalized graphene sheets (FGS) to silicone elastomer. Within the context of the present invention the term "silicone elastomer" is used to refer to any of a variety of elastomeric modified silicone polymers as distinct from unmodified polydimethylsiloxane (PDMS). The invention has higher modulus, strength, failure strain, electrical conductivity and lower gas permeability than the unfilled silicone elastomer. The current invention introduces new applications for silicone elastomer, such as electrically conductive and low-permeability coating, adhesive and sealants, as well as flexible electrodes, actuators, pressure sensor, printed circuits and electromagnetic interference shielding material.

The FGS-silicone elastomer nanocomposite of a most preferred embodiment of the present invention simultaneously has superior mechanical, electrical and barrier properties compared to unfilled silicone elastomers. Furthermore, the current invention provides a method to detect internal damage within the material through conductance measurements. So when used in the industry, it possesses health-monitoring capability which can be crucial for applications using the nanocomposite. The product also has lower density than commercially available silicone and therefore can reduce the energy cost associated with transporting and using the product.

FGS can be produced via a process that has been described in published articles (H. C. Schniepp, J.-L. Li, M. J. McAllister, et al., *J. Phys. Chem. B* 110, 8535-39, 2006; M. J. McAllister, J.-L. Li, D. H. Adamson, H. C. Schniepp, et al., *Chem. Materials* 19, 4396-4404, 2007) (the entire contents of each of which are hereby incorporated by reference) and the '432 application noted above.

In a preferred embodiment of the present invention method for forming the nanocomposite, FGS is dispersed in a polar solvent, such as tetrahydrofuran, and probe-sonicated. Then the suspension is combined with a vinyl terminated polysiloxane (preferably a vinyl terminated polydimethylsiloxane) and the polar solvent is completely evaporated off. An appropriate crosslinker and hydrosilylation catalyst (preferably a platinum complex catalyst) are combined with the resulting mixture and the mixture is cured at elevated temperature, preferably about 100° C. for a period of time from 1 to 48 hours, preferably from 5 to 30 hours, more preferably from 20-25 hours, most preferably approximately 24 hours.

The crosslinking reaction for the silicone elastomer involves the reaction between the crosslinker, and the vinyl terminating groups on the vinyl-terminated polysiloxane in the presence of a hydrosilylation catalyst. Suitable crosslinking agents include any conventional crosslinking agent, such as those disclosed in "The Basics of Silicon Chemistry" (Dow Corning Publication); W. Noll, *Chemistry and technology of Silicones*, Academic Press, New York (1968); T. C. Kendrick, B. Parbhoo, J. W. White, "Siloxane Polymers and Copolymers," in *The Chemistry of Organic Silicon Compounds Pt. 2* (edited by S. Patai and Z. Rappoport), 21, p. 1289-1361, John Wiley, Chichester (1989); and S. J. Clarson, J. A. Semlyen, *Siloxane Polymers*, Prentice Hall, New Jersey (1993), the contents of each of which are hereby incorporated by reference. Preferably, the crosslinking agent is selected from tetrakis (dimethyl siloxy) silanes, or poly (hydromethylsiloxane) crosslinkers. The resulting mechanical properties, electrical properties and gas permeability of the FGS-silicone elastomer nanocomposite showed increased modulus, elongation at break, tensile strength and electrical conductivity and decreased gas permeability, as compared to the same silicone elastomer without the FGS filler.

The hydrosilylation catalyst is not particularly restricted, and can be any conventional hydrosilylation catalyst. Specific examples include, but are not limited to, chloroplatinic acid, elementary platinum, solid platinum supported on a carrier such as alumina, silica or carbon black; platinum-vinylsiloxane complexes {e.g. $Pt_n$ $(ViMe_2SiOSiMe_2Vi)_n$, $Pt[(MeViSiO)_4]_m$}; platinum-phosphine complexes {e.g. $Pt(PPh_3)_4$, $Pt(PBU_3)_4$}; platinum-phosphite complexes {e.g. $Pt[P(OPh)_3]_4$, $Pt[P(OBu)_3]_4$} (in the above formulas, Me stands for methyl, Bu for butyl, Vi for vinyl, Ph for phenyl, and n and m each represents an integer); Pt $(acac)_2$; and platinum-hydrocarbon conjugates described by Ashby et al. in U.S. Pat. Nos. 3,159,601 and 3,159,662 as well as platinum alcoholates described by Lamoreaux et al. in U.S. Pat. No. 3,220,972, the contents of each of which are hereby incorporated by reference.

As examples of the catalyst, other than platinum compounds, there may be mentioned $RhCl(PPh_3)_3$, $RhCl_3$, $Rh/Al_2O_3$, $RuCl_3$, $IrCl_3$, $FeCl_3$, $AlCl_3$, $PdCl_2.2H_2O$, $NiCl_2$, $TiCl_4$, etc. These catalysts may be used singly or two or more of them may be used in combination. From the viewpoint of catalytic activity, chloroplatinic acid, platinum-olefin complexes, platinum-vinylsiloxane complexes, Pt(acac), and the like are preferred, with platinum-cyclovinyl-methylsiloxane complex being most preferred. The amount of the catalyst is not particularly restricted but the catalyst is preferably used in an amount within the range of $10^{-1}$ to $10^{-8}$ moles, more preferably $10^{-2}$ to $10^{-6}$ moles, per mole of the alkenyl group in the vinyl-terminated polysiloxane. Hydrosilylation catalysts are generally expensive and corrosive and, in some instances, they induce generation of hydrogen gas in large amount to thereby cause foaming of cured products. Therefore, it is recommended that their use in an amount of more than $10^{-1}$ moles be avoided.

Within the context of the present invention, the term "vinyl-terminated polysiloxane" is used to represent a component of the present invention siloxane elastomer that contains at least one diorganosiloxane unit and has at least two silicon-bonded alkenyl groups in each molecule. The alkenyl group can be exemplified by vinyl, allyl, butenyl, pentenyl, hexenyl, and heptenyl and is preferably vinyl. The non-alkenyl Si-bonded organic groups are exemplified by alkyl groups such as methyl, ethyl, propyl, butyl, pentyl, and hexyl; aryl groups such as phenyl, tolyl, and xylyl; and halogenated alkyl groups such as 3-chloropropyl and 3,3,3-trifluoropropyl, and is preferably methyl and/or phenyl. The molecular structure of the vinyl-terminated polysiloxane is not critical as long as it contains at least one diorganosiloxane unit, i.e., siloxane unit with a general formula $R_2SiO_{2/2}$. As other siloxane units, the vinyl-terminated polysiloxane may contain small amounts of siloxane unit with a general formula $R_3SiO_{1/2}$, siloxane unit with a general formula $RSiO_{3/2}$, and siloxane unit with a general formula. $SiO_{4/2}$. R in the preceding formulas represents a substituted or unsubstituted monovalent hydrocarbon group and can be exemplified by the alkyl, alkenyl, aryl, and halogenated alkyl referenced above. The molecular structure of the vinyl-terminated polysiloxane can be exemplified by straight chain, branched chain, partially branched straight chain, and dendritic, wherein straight chain, branched chain, and partially branched straight chain are preferred. The viscosity of the vinyl-terminated polysiloxane at 25° C. is not critical, but is preferably 100 to 1,000,000 mPas and more preferably is 100 to 500,000 mPas, most preferably from 100 to 300,000 mPas. The weight average molecular weight of the vinyl-terminated polysiloxane is also not particularly critical and will depend on the end use desired for the finished FGS-SE composition. Preferably the weight average molecular weight of the vinyl-terminated polysiloxane is in a range from 5000 to 2,000,000, more preferably from 5000 to 50,000, more preferably from 8000 to 12,000.

The vinyl-terminated polysiloxane is preferably a member selected from dimethylvinylsiloxy-endblocked dimethylpolysiloxanes; dimethylvinylsiloxy-endblocked dimethylsiloxane-methylvinylsiloxane copolymers; trimethylsiloxy-endblocked dimethylsiloxane-methylvinylsiloxane copolymers; branched-chain dimethylpolysiloxane with molecular chain ends terminated by dimethylvinylsiloxy and trimethylsiloxy; trimethylsiloxy-endblocked branched-chain dimethylsiloxane-methylvinylsiloxane copolymers; the organopolysiloxanes afforded by replacing all or part of the methyl in the preceding organopolysiloxanes with alkyl such as ethyl or propyl, aryl such as phenyl or tolyl, or halogenated alkyl such as 3,3,3-trifluoropropyl; the organopolysiloxanes afforded by replacing all or part of the vinyl in the preceding organopolysiloxanes with alkenyl such as allyl or propenyl; and mixtures of two or more of the preceding organopolysiloxanes.

For convenience, the vinyl-terminated polysiloxane will be discussed with reference to a vinyl-terminated poly (dimethylsiloxane). However, this is not intended to be limiting of the present invention, but merely used in an exemplary manner for convenience.

The present invention nanocomposite properties provide the ability to monitor the structural health of products formed from the nanocomposite by measuring conductance properties to detect internal damage in the resulting product.

In the product of the present invention, tensile properties improvements are preferably achieved when FGS is percolated in SE. Within the context of the present invention, the term "percolated" is intended to indicate that a continuous path is established in three dimensions through the FGS by formation of a connected FGS network with nanometer scale separation at the contact point between individual sheets. Normally, the FGS sheets are statistically in contact. Indications of percolation are the onset of the transition from non-electrically conducting to electrically conducting, or the state in which the storage and loss moduli measured as a function of frequency (G'($\omega$) and G'($\omega$), respectively) scale as G'($\omega$)~G'($\omega$)~$\omega$". These characteristics are meant to be indicative of percolation and are not intended as limiting the present invention. Agglomeration of FGS can be observed using SEM. The agglomeration facilitates electrical percolation and therefore tensile properties improvements. Although the present inventors do not wish to be bound by any particular mechanistic explanation for the improvement in properties in the present invention, it is believed that the increase of tensile strength can be attributed to load transfer to FGS. The increase of elongation at break is believed to be due to the dilation effect of tearing and distributed deformation introduced by the percolated FGS network. The reversal in the elongation at break is observed and is believed to be due to the competing effects of the degree of tear opening and the number of tears with increasing FGS concentration. Multifunctional reinforcement of SE by FGS is also demonstrated.

Experimental Section 2.1. Materials. Vinyl-terminated PDMS with an average molecular weight of 9400, tetrakis(dimethylsiloxy)silane and platinum-cyclovinylmethylsiloxane complex were obtained from Gelest, Inc. Tetrahydrofuran (THF) was purchased from Sigma Aldrich. FGS was produced using a thermal exfoliation method previously reported using graphite oxide (GO) supplied by Vorbeck Materials.[27,27] The carbon to oxygen ratio of the FGS was determined to be 15 to 1 using modified classical Pregl and Dumas method by Atlantic Microlab, Inc.[41]

[27] McAllister, M. J.; Li, J. L.; Adamson, D. H.; Schniepp, H. C.; Abdala, A. A.; Liu, J.; Herrera-Alonso, M.; Milius, D. L.; Car, R.; Prud'homme, R. K.; Aksay, I. A. *Chemistry Of Materials* 2007, 19, (18), 4396-4404

[41] Patterson, R. K. *Analytical Chemistry* 1973, 45, (3), 605-609

2.2. Processing of Unfilled SE and FGS-SE Nanocomposite. An SE network was prepared by end-linking the di-functional vinyl-terminated PDMS molecules and the tetra-functional crosslinker tetrakis(dimethylsiloxy silane) with platinum cyclovinylmethylsiloxane complex as the catalyst. The crosslinking resulted from the reaction of terminating vinyl groups on the PDMS with silicon hydride groups on the tetrakis(dimethylsiloxy silane).

The unfilled SE samples were produced as follows: predetermined amounts of PDMS, the crosslinking agent tetrakis(dimethylsiloxy)silane and the catalyst platinum-cyclovinylmethylsiloxane were mixed by magnetic stirring for 20 min; the mixture was then poured onto a polytetrafluoroethylene mold and cured at 100° C. for 12 h. FGS-SE nanocomposites were produced as follows: an FGS suspension with a concentration of 1 mg/ml was made by mixing a predetermined amount of FGS and tetrahydrofuran (THF) in a beaker. The beaker was immersed in an ice bath while the suspension was probe-sonicated for 30 mum (VirSonic 100, The Virtis Co., NY; with an output power 12 W). After sonication, the suspension was transferred to another beaker containing a desired amount of PDMS polymer. The mixture containing the FGS, THF, and PDMS was placed on a stir plate heated to 60° C. to evaporate off all the THF with magnetic stirring. After all the THF evaporated, the thixotropic mixture was cooled to room temperature before tetrakis(dimethylsiloxy)silane and platinum-cyclovinylmethylsiloxane were added. The mixture was hand-mixed with a steel spatula for 15 min. The final mixture was then transferred to a polytetrafluoroethylene mold. A metal plate was used to shear and spread the mixture evenly across the mold. The shearing velocity of the plate was 6 cm/s. Finally, the mixture was cured in an oven at 100° C. for 12 h. For 3 wt % FGS-SE nanocomposites, the samples were prepared using vacuum molding to minimize trapped air bubbles.

2.3. Mechanical Property Measurements. Tensile and mechanical hysteresis measurements were made under ambient conditions using an Instron tensile testing machine (Model II22, Instron, MA). The dog-bone-shaped samples used in the measurements were 22.55 mm long and 4.55 mm wide in the narrow region. Thickness of the samples varied between 0.2 to 0.6 mm. The strain rate was set to 50.8 mm/min. For the hysteresis measurements, samples were stretched to 70%-80% of its average failure strain, returned to a stress level of zero and were stretched again to a strain level similar to that of the first stretch. Samples were then placed in an oven set to 100° C. to recover for 24 h and then their stress-strain curves were measured again. The area under the stress-strain curve was calculated and the difference in the area between the first stretch and the stretch after recovery was obtained. Hysteresis loss ratio was computed by dividing the difference with the area of the first stretch. The reported hysteresis loss ratio is an average from three samples.

2.4. Scanning Electron Microscopy Characterization (SEM). Images of cryo-fractured SE or FGS-filled SE were taken with two different SEMs. Tescan Vega SEM (Tescan USA, PA) was used to characterize the sample without conductive coatings at magnifications up to 3700. To obtain high resolution images, the samples were coated with 3 nm iridium. An FEI XL-30 field emission gun SEM (Philips, MA) was used to image the samples.

2.5. Electrical Conductivity Measurements. The direct current transverse resistivity (the resistivity across the film thickness direction) of the FGS-SE nanocomposites was measured with a resistivity test fixture (Keithley 8009, Keithley Instrument Inc., OH) coupled with a digital multimeter (Keithley 6517). The composite film was cut into a circular film with a diameter of 70 mm and placed between the top and guarded electrodes for the measurement. The DC longitudinal resistivity (the resistivity along the in-plane direction of the film) was measured using a standard 4-point technique. The nanocomposite film was cut into rectangular shape films (1-2 cm in width and 2-4 cm in length). A film was placed on a polystyrene petri-dish and conductive copper-nickel adhesive tape (Electron Microscopy Sciences) was placed near the two ends of the film. Conductive carbon paste (Electron Microscopy Science) was used to draw conductive paths between the sample and the copper tape. The resistance was measured with a DC power supply (Tektronix PS2521G, Tektronix, OR), digital multimeter (Fluke 27, Fluke Corporation, WA) and electrometer (Keithley 6514). The conductivity of a sample film was calculated based on the dimension of the film. The longitudinal conductivity of SE with FGS concentration less than 0.2 wt. % was below the detection limit of the devices and thus could not be measured. All the electrical conductivities were the average from two separately made samples.

2.6. Gas Permeation Measurements. Oxygen and nitrogen permeability of unfilled and FGS-filled SE was obtained using a constant pressure/variable volume type permeation cell from Professor Donald Paul's lab at University of Texas.[42] The amount of gas that has permeated was measured and plotted as a function of time. The permeability was determined from the slope of the linear portion of the plot (steady state).

[42] Takahashi, S.; Goldberg, H. A.; Feeney, C. A.; Karim, D. P.; Farrell, M.; O'Leary, K.; Paul, D. R. *Polymer* 2006, 47, (9), 3083-3093

2.7. Two Dimensional Viscoelastic Lattice Model. A two dimensional viscoelastic lattice model for the elastomer matrix with the ability to visualize tearing was utilized to explain the mechanical reinforcement in FGS-SE nanocomposites. Detailed description of the model is provided elsewhere.[43] Briefly, the model is composed of one dimensional trusses arranged in a two dimensional (the third dimension is of unit thickness) triangular lattice. A Zener viscoelastic element is used to model the behavior of each truss. A tear can be initiated when the axial stress of one truss element exceeds a prescribed breaking stress. It is known that like other materials, elastomers have intrinsic defects tens to hundreds of microns in size, that are possibly introduced while molding or cutting a test sample.[44,45] Tearing is first initiated from these defects. Due to the presence of these weak links, other parts of the matrix may not even be sampled mechanically when the failure occurs. Such heterogeneity of breaking stress within the SE matrix is incorporated in the model by assigning spatially varying breaking stress across the matrix.

[43] Sanborn, S. E.; Pan, S.; Prevost, J. H.; Aksay, I. A. *Submitted to Macromolecules*
[44] Choi, I. S.; Roland, C. M. *Rubber Chemistry And Technology* 1996, 69, (4), 591-599
[45] Hamed, G. R. *Rubber Chemistry And Technology* 1983, 56, (1), 244-251

Two domains were simulated in the model: a small length-scale model with unpercolated FGS and a large length-scale model with percolated FGS network. The number of trusses was kept constant. In the small length-scale model, the representative volume element (RYE) had a similar length-scale to that of the weak links in the matrix, whose dimension was set to be an order of magnitude larger than the length scale of individual FGS. In the large length-scale model, the percolated FGS had a length scale comparable to the RYE. The matrix was set to have homogeneous breaking stress since the percolated FGS has much larger length scale than the heterogeneities. In the FGS-SE nanocomposite model, individual FGS and percolated FGS were represented by black lines with a stiffness four orders of magnitude larger than that of the matrix. FGS itself and the FGS-SE interface does not fail in the model. One hundred simulations were run for each FGS concentration.

The matrix is deformed in the tensile direction at a strain rate of 0.0076/s, which is the loading rate used in the experiment.

Figures 1A, 1B, 1C, 1D, 1E, 1F:
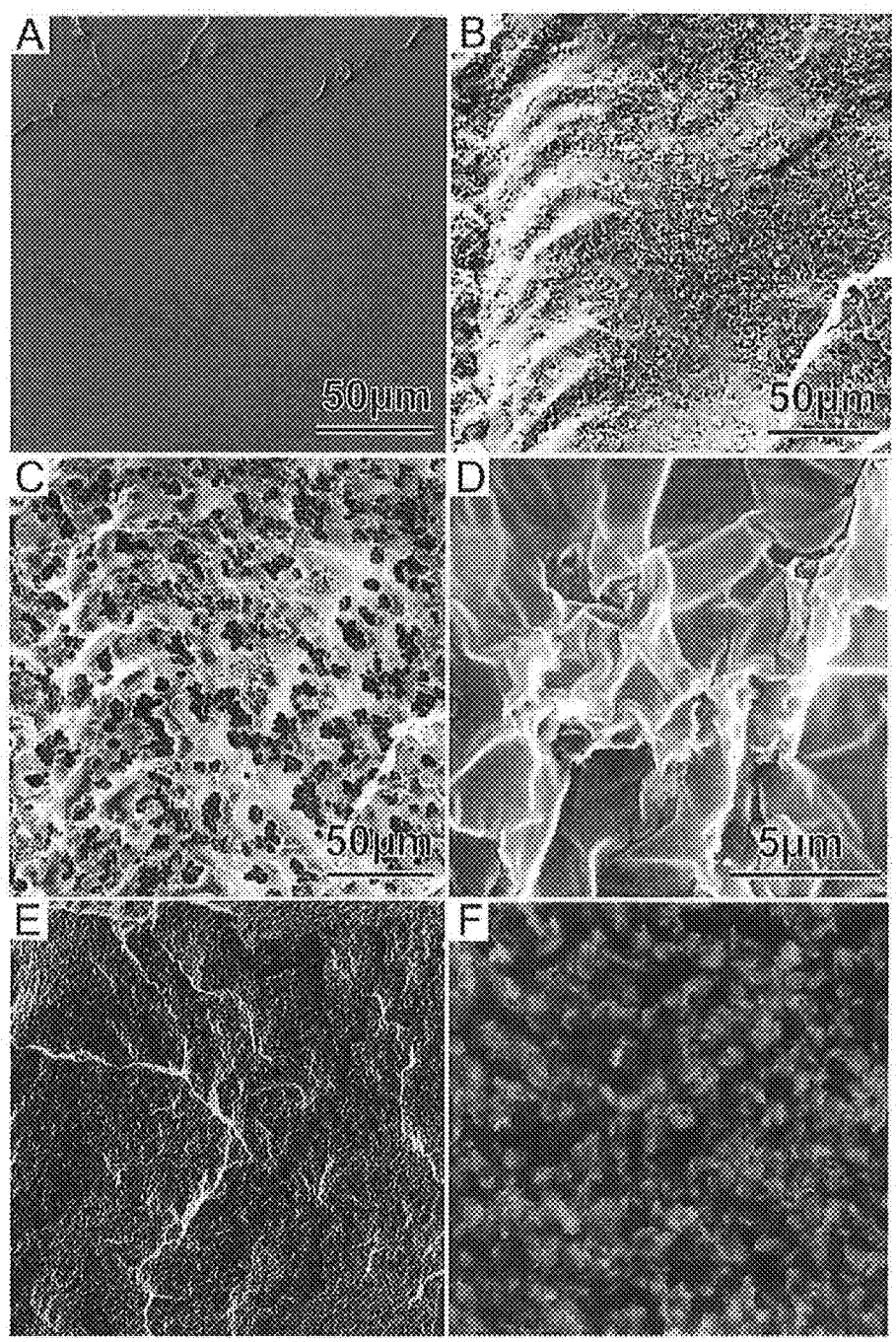
FIGS. 1A-1F show SEM images of cryo-fractured unfilled and FGS-filled SE surfaces.
Figure 2:
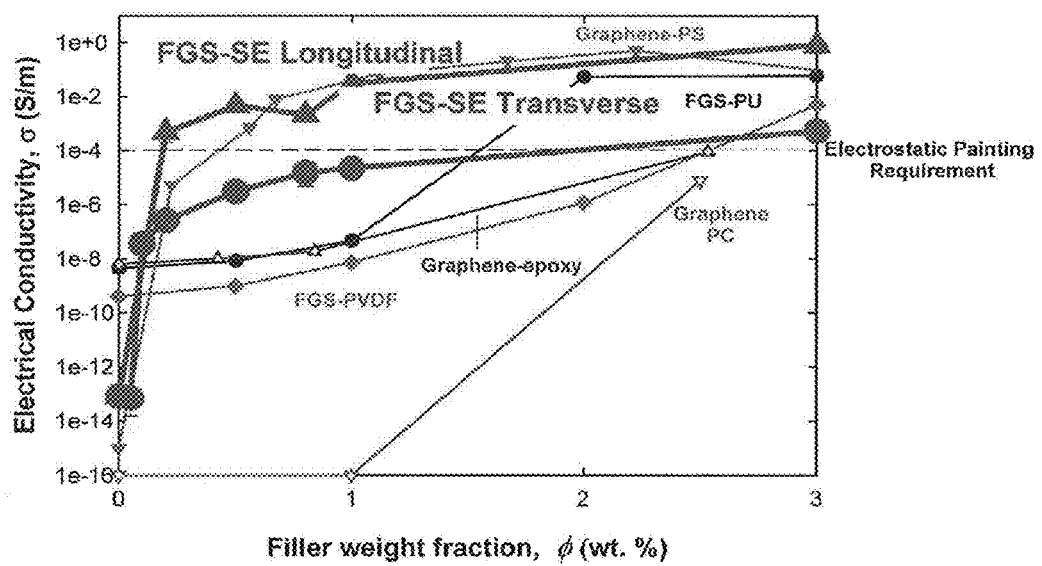
FIG. 2 provides a graphical representation of the effect of filler concentration on the electrical conductivity of various FGS and graphene filled nanocomposites.
Figure 3:
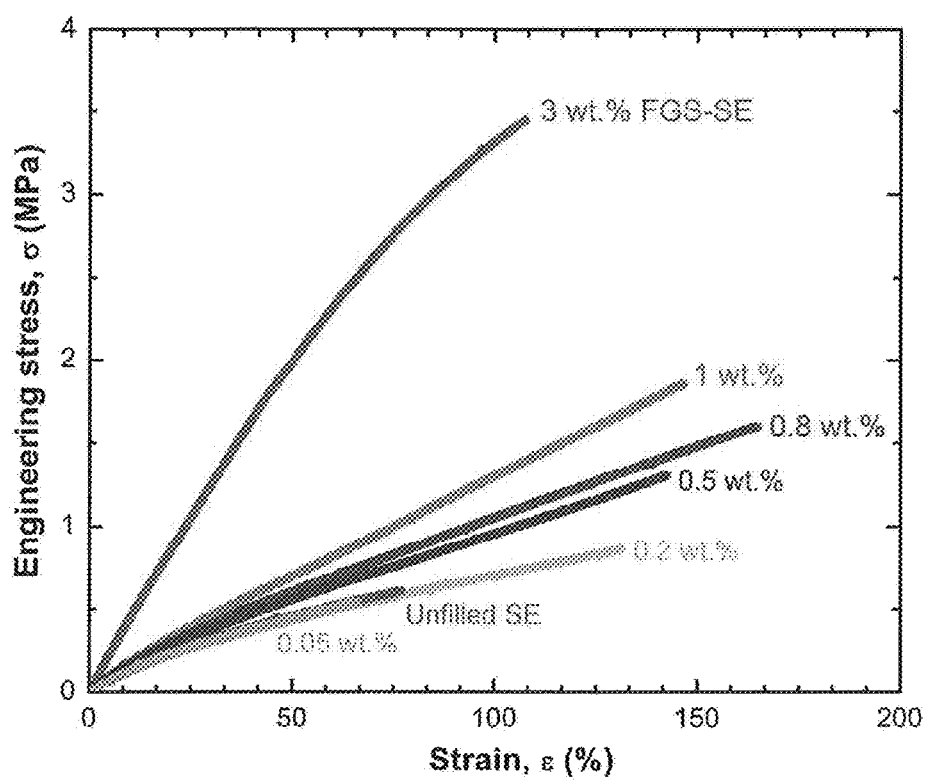
FIG. 3 provides a graphical representation of stress-strain curves of FGS-SE nanocomposites at different FGS concentrations.

Results and Discussion 3.1 Characterization of FGS dispersion. To elucidate the effect of filler agglomeration on the mechanical properties of FGS-SE nanocomposites, SEM was used to characterize the FGS dispersion state in SE matrix. The images of cryo-fractured surfaces of unfilled and FGS-filled SE are shown in FIGS. 1A-1F. The cryo-fractured surface of the unfilled SE without conductive coating was smooth (FIG. 1A). The morphology of FGS-filled SE was very different from that of the unfilled SE. As shown in FIG. 1B, the back-scattered electron SEM image of an uncoated cryo-fractured-surface of 0.2 wt. % FGS-SE showed the presence of rough and smooth morphologies. The rough morphology was likely due to the presence of FGS. In the secondary electron image of the same area (FIG. 1C), both bright and dark regions were observed. The dark regions correlated well with the rough regions in the back-scattered electron image. As the dark regions did not appear in the same sample with a conductive coating, they are due to the conductivity variation across the fractured surface. In SEM imaging, an electron beam bombards the sample and regions with low electrical conductivity or without conductive pathways would accumulate charges due to the lack of charge dissipation mechanism and therefore appear brighter in the image. When regions with spatially varying conductivities exist in a sample, regions with higher conductivity would appear to be darker than less-conducting regions. Since FGS was the only filler in the nanocomposite, the dark regions must be the percolated FGS-rich regions and the bright regions were the FGS-lean regions. As shown in FIG. 1D, the wrinkled morphology of the FGS rich regions resembled that of the FGS, confirming the agglomeration of FGSs.

The above evidence suggests that at a 0.2 wt. % FGS loading, we have a composite material at two length scales: the first one is the segregation of FGS-rich and FGS-lean regions with a length scale of 5-15 μm and the second length scale is the ultimate FGS-SE nanocomposite in the FGS-rich regions.

At a high enough FGS concentration, the entire sample is expected to be composed of FGS-rich regions. That was indeed observed. When the FGS concentration was increased to 0.8 wt. %, the conductivity induced contrast in the SEM image disappeared, indicating the existence of FGS-rich regions across the entire sample (FIG. 1E). The uniform dispersion of FGS in 1 wt. % FGS-SE was demonstrated in FIG. 1F.

3.2 Electrical properties of FGS-SE nanocomposite. To characterize the percolation threshold of FGS in SE, the electrical conductivity as a function of FGS weight percentage was measured and is shown in Error! Reference source not found. At 0.05 wt. % loading, there was no increase in the transverse electrical conductivity, indicating a percolated FGS network had not yet formed. The transverse conductivity increased by almost 6 orders of magnitude when 0.1 wt. % FGS was added. At an FGS loading of only 0.2 wt. %, the longitudinal conductivity increased by more than 10 orders of magnitude and the transverse conductivity increased by 7 orders of magnitude. Anisotropy in electrical conductivity was observed. The longitudinal conductivity at 0.2 wt. % loading has already satisfied the conductivity requirement for electrostatic dissipation ($10^{-5}$ S/m) and also the electrostatic painting applications ($10^{-4}$ S/m).[46] At 0.5 wt. % loading, the electrical conductivity of SE increased to $4.5 \times 10^{-3}$ S/m in the longitudinal direction and to $1.6 \times 10^{-6}$ S/m in the transverse direction. Further increase in the FGS loading above 0.5 wt. % led to a more gradual enhancement in conductivity. The conductivity reached 0.89 S/m in the longitudinal direction and $6.6 \times 10^{-4}$ S/m in the transverse direction at 3 wt. % loading.

[46] Ramasubramaniam, R.; Chen, J.; Liu, H. Y. *Applied Physics Letters* 2003, 83, (14), 2928-2930

When conductive fillers form a network of connected paths through the insulating matrix, a rapid increase in the electrical conductivity is expected.[47] FIGS. 1A-1F suggest that the percolation threshold was between 0.05 wt. % and 0.1 wt. % as evidenced by a rapid increase in the tranverse conductivity (almost 6 orders of magnitude) followed by a more gradual increase in conductivity (1 order of magnitude increase from 0.1 wt. % to 0.2 wt. % FGS). The observed electrical percolation threshold is, to the best of our knowledge, among the lowest in filled SE, second only to one case of multiwall carbon nanotube (MWNT)-SE nanocomposite.[17] The conductivity of FGS-SE as a function of filler concentration is compared to that of other graphene-based polymer nanocomposites, as shown in Error! Reference source not found.A-1F. The observed electrical percolation in FGS-SE is lower than that of graphene-polymer nanocomposites previously reported.[28,30,31,48,49,50,51] The longitudinal conductivities of FGS-SE are comparable to the best MWNT filled SE and graphene based polymer nanocomposites.[28,52]

[47] Ruschau, G. R.; Yoshikawa, S.; Newnham, R. E. *Journal Of Applied Physics* 1992, 72, (3), 953-959
[17] Bokobza, L.; Rahmani, M. *Kgk-Kautschuk Gummi Kunststoffe* 2009, 62, (3), 112-117
[28] Stankovich, S.; Dikin, D. A.; Dommett, G. H. B.; Kohlhaas, K. M.; Zimney, E. J.; Stach, E. A.; Piner, R. D.; Nguyen, S. T.; Ruoff, R. S. *Nature* 2006, 442, (7100), 282-286
[30] Kim, H.; Macosko, C. W. *Macromolecules* 2008, 41, (9), 3317-3327
[31] Kim, H.; Macosko, C. W. *Polymer* 2009, 50, (15), 3797-3809
[48] Ansari, S.; Giannelis, E. P. *Journal of Polymer Science Part B-Polymer Physics* 2009, 47, (9), 888-897
[49] Nguyen, D. A.; Lee, Y. R.; Raghu, A. V.; Jeong, H. M.; Shin, C. M.; Kim, B. K. *Polymer International* 2009, 58, (4), 412-417
[50] Liang, J. J.; Wang, Y.; Huang, Y.; Ma, Y. F.; Liu, Z. F.; Cai, F. M.; Zhang, C. D.; Gao, H. J.; Chen, Y. S. *Carbon* 2009, 47, (3), 922-925
[51] Steurer, P.; Wissert, R.; Thomann, R.; Muihaupt, R. *Macromolecular Rapid Communications* 2009, 30, (4-5), 316-327
[52] Khosla, A.; Gray, B. L. *Materials Letters* 2009, 63, (13-14), 1203-1206

The electrical percolation threshold is influenced by the filler aspect ratio and shape, as well as filler dispersion in the matrix.[53,54,55] A theoretical percolation threshold of plates having an aspect ratio of 476 is estimated to be 0.27 vol. %.[53] The experimentally observed percolation was less than one fourth of the theoretically predicted value. The lower percolation threshold can be attributed to the agglomeration of FGS which lowers the percolation threshold.[54,55] There exists van der Waals' attraction between FGSs. Since PDMS has attractive interaction with FGS by forming hydrogen bonds, PDMS chains can introduce bridging attraction. Both van der Waals's and bridging attraction contribute to the agglomeration of FGS. In another study by our group, homogeneous dispersion of FGS in poly(ethylene oxide) led to a higher percolation threshold of 1 wt. %, corroborating the agglomeration-induced percolation of FGS in SE.[56] Due to the FGS agglomeration, the percolation threshold of FGS-SE was not determined using a typical percolation model which assumes homogeneous distribution of fillers.[57]

[53] Garboczi, E. J.; Snyder, K. A.; Douglas, J. F.; Thorpe, M. F. *Physical Review E* 1995, 52, (1), 819-828
[54] Pegel, S.; Potschke, P.; Petzold, G.; Alig, I.; Dudkin, S. M.; Lellinger, D. *Polymer* 2008, 49, (4), 974-984.
[55] Alig, I.; Lellinger, D.; Engel, M.; Skipa, T.; Potschke, P. *Polymer* 2008, 49, (7), 1902-1909
[56] Korkut, S.; et. al. Manuscript in preparation.
[57] McLachlan, D. S.; Chiteme, C.; Park, C.; Wise, K. E.; Lowther, S. E.; Lillehei, P. T.; Siochi, E. J.; Harrison, J. S. *Journal Of Polymer Science Part B-Polymer Physics* 2005, 43, (22), 3273-3287

The electrical conductivity of a conductive composite is governed by the intrinsic conductivity of fillers, constriction and tunneling resistance at the contact between fillers and the number of contact spots.[47,58] Constriction resistance is associated with constriction of electron flow through the contact area between two filler particles and is inversely proportional to the contact area. The morphology of graphene sheet, which is determined by its functional groups and defects,[59] can influence the contact area and therefore the constriction resistance in the composites.

[47] Ruschau, G. R.; Yoshikawa, S.; Newnham, R. E. *Journal Of Applied Physics* 1992, 72, (3), 953-959
[58] Simmons, J. G. *Journal Of Applied Physics* 1963, 34, (6), 1793-&
[59] Schniepp, H. C.; Kudin, K. N.; Li, J. L.; Prud'homme, R. K.; Car, R.; Saville, D. A.; Aksay, I. A. *Acs Nano* 2008, 2, (12), 2577-2584

Tunneling resistance is due to the tunneling of electrons through insulating films covering the fillers and it is proportional to the work function of the conductor, thickness and dielectric and thermal properties of the film.[47,58] The dielectric constant of the matrix influences the barrier height, distance of tunneling and therefore the tunneling resistance. Since the dielectric constant of most materials is a function of temperature, thermal properties of the matrix also plays a role in the tunneling resistance.[60] The thermal expansion coefficient of the matrix is also important. Contact force between the filler, which is determined by the internal stress inside the composite, strongly influences the tunneling distance and therefore the overall conductivity of the composite.[61] During heat curing of SE and subsequent cooling to room temperature, volumetric shrinkage of SE could occur which induced compressive stress between FGS. Shrinkage from the processing of composites can alter the tunneling distance.[62]

[47] Ruschau, G. R.; Yoshikawa, S.; Newnham, R. E. *Journal Of Applied Physics* 1992, 72, (3), 953-959
[58] Simmons, J. G. *Journal Of Applied Physics* 1963, 34, (6), 1793-&
[60] von Hippel, A. R., *Dielectric Materials and Applications*. Technology Press of MIT: Cambridge, 1961
[61] Li, L.; Morris, J. E. In *Electrical conduction models for isotropically conductive adhesive joints*, 1997; Ieee-Inst Electrical Electronics Engineers Inc: 1997; pp 3-8
[62] Zweifel, Y.; Plummer, C. J. G.; Kausch, H. H. *Journal Of Materials Science* 1998, 33, (7), 1715-1721

The number of contact spots between fillers is influenced by their dispersion. Better dispersion enables more contacts between graphene sheets, more conductive paths at a given filler concentration and therefore higher conductivity.

It is difficult to compare the conductivity of composites with different fillers and matrices as aforementioned factors can be different for different systems. Even for graphene-polymer nanocomposites, the difference in the dielectric and thermal properties of the matrix can lead to different tunneling resistance. The morphology, as well as the dispersion of graphene can be different depending on the functional groups and defects on graphene.

Preferential orientation of FGS during the shear molding process led to fewer contacts in the transverse direction and more contacts in the longitudinal direction, causing the observed anisotropy in the nanocomposite conductivity.[63]
[63] Du, F. M.; Fischer, J. E.; Winey, K. I. *Physical Review B* 2005, 72, (12), 4

3.3 Mechanical properties of graphene-SE nanocomposite. The stress-strain curves of unfilled and FGS-filled SE are shown in Error! Reference source not found., and the values of modulus, tensile strength and elongation at break at various FGS weight and volume percentages are shown in Table 1.

TABLE 1

Values of the modulus, tensile strength and elongation at break for FGS-SE nanocomposite at various FGS loadings. To convert from weight percentage to volume percentage, SE density of 0.97 g/cm$^3$ and FGS density of 2.25 g/cm$^3$ were used.

| FGS weight % | FGS volume % | Modulus, E (MPa) | Elongation at break, $\epsilon_b$ (%) | Strength, $\epsilon_b$ (MPa) |
|---|---|---|---|---|
| 0 | 0 | 1.33 ± 0.12 | 74 ± 16 | 0.57 ± 0.09 |
| 0.05 | 0.022 | 1.42 ± 0.13 | 66 ± 11 | 0.52 ± 0.06 |
| 0.2 | 0.088 | 1.64 ± 0.17 | 138 ± 17 | 0.90 ± 0.09 |
| 0.5 | 0.22 | 1.77 ± 0.11 | 139 ± 15 | 1.30 ± 0.10 |
| 0.8 | 0.35 | 1.93 ± 0.12 | 149 ± 40 | 1.49 ± 0.036 |
| 1 | 0.43 | 2.13 ± 0.13 | 138 ± 19 | 1.78 ± 0.21 |
| 3 | 1.31 | 4.86 ± 0.44 | 112 ± 9 | 3.43 ± 0.22 |

For each FGS loading, the crosslinker and the catalyst concentration were chosen to yield the highest tensile strength of the samples. At 0.05 wt. % (0.022 vol. %) FGS loading, no improvement in mechanical properties was observed. At 0.2 wt. % (0.086 vol. %), a 23% increase in the modulus, an 87% increase in the elongation at break and a 58% increase in the tensile strength were observed. At 0.5 wt. % (0.22 vol. %) FGS, a 33% increase in the modulus, 87% increase in elongation at break and a 128% increase in the tensile strength were achieved. At a 3 wt. % (1.34 vol. %) FGS loading, the modulus increased by 265%, the elongation at break increased by 51% and the tensile strength increased by over 500%. Above the percolation threshold, the modulus and tensile strength increased with the FGS concentration whereas the elongation at break increased initially with FGS content up to 1 wt. % (0.45 vol. %) and then decreased at higher FGS loadings. There appeared to exist a critical FGS concentration between 0.5 wt. % and 1 wt. % beyond which the elongation at break of the composite started decreasing.

Figures 4A, 4B, 4C, 4D, 4E, 4F:
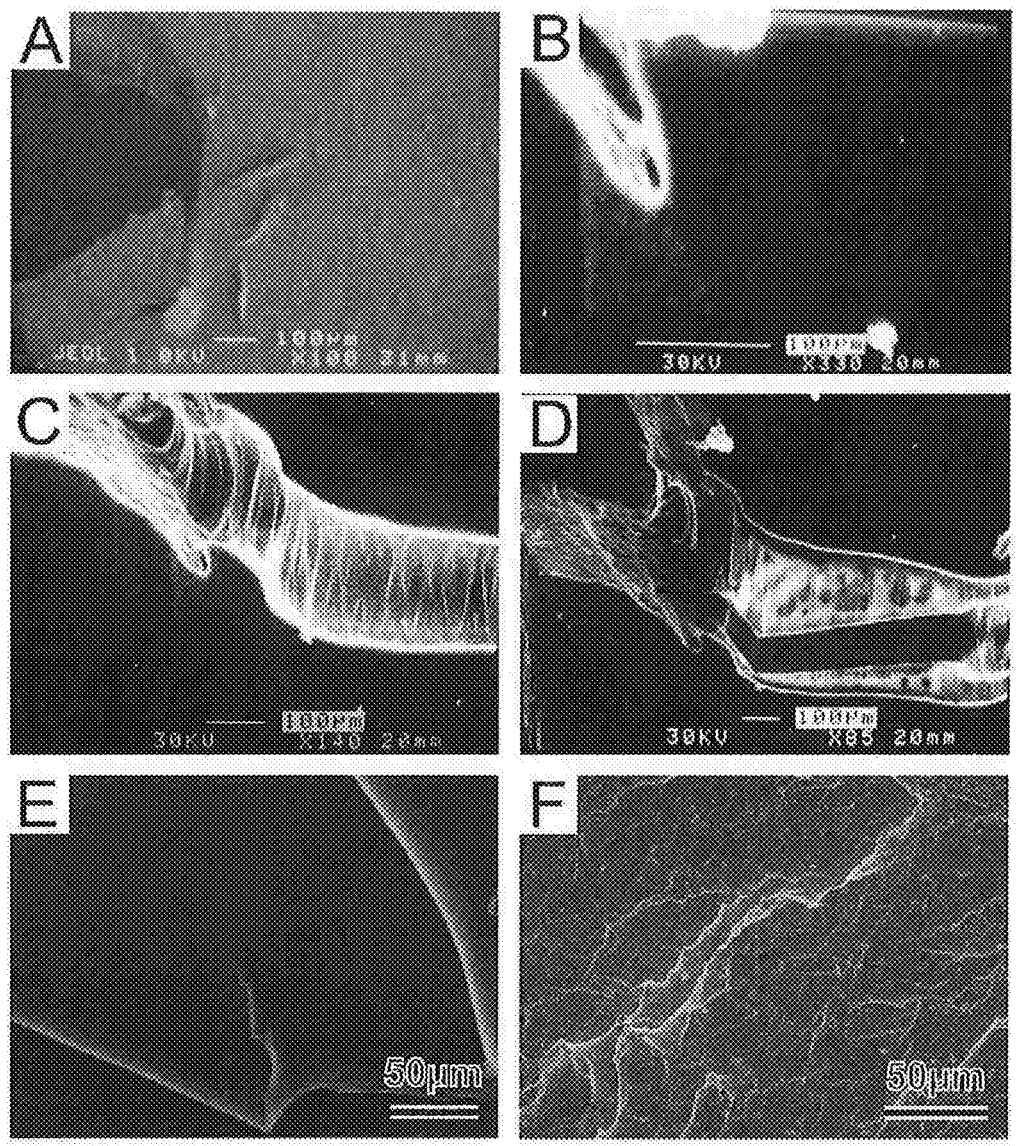
FIGS. 4A-4F provide photographs of the tearing of unfilled SE (A) and 0.5 wt. % FGS-SE (B)-(D) and SEM images of tensile-fractured surfaces of unfilled (E) and 0.5 wt % FGS-filled SE (F).
Figure 5:
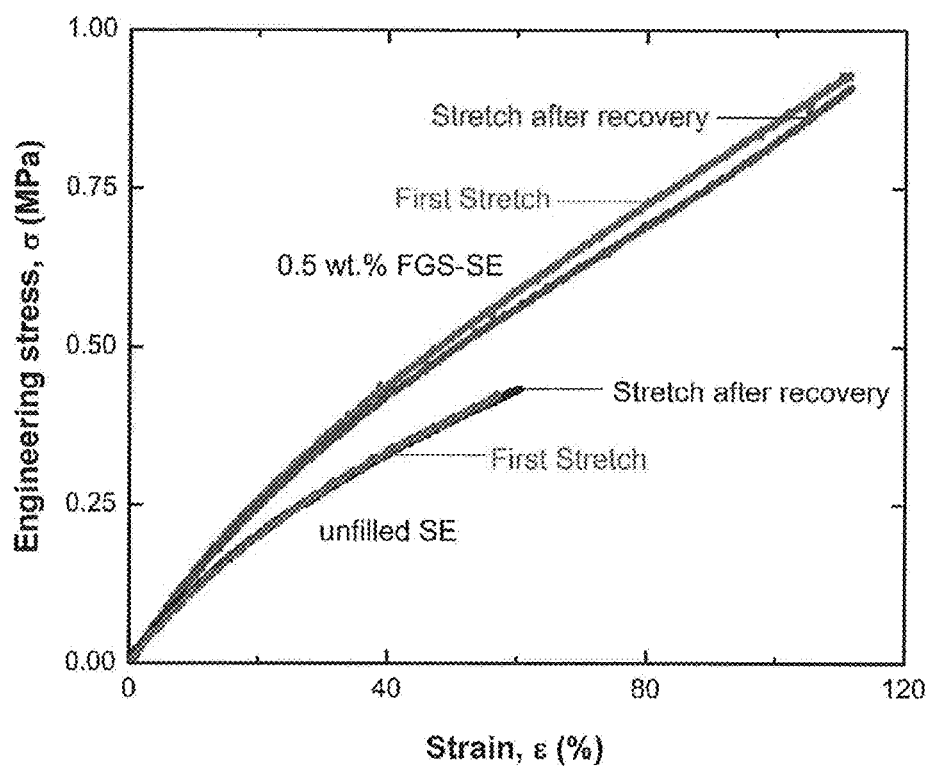
FIG. 5 provides a graphical representation of hysteresis characterization of unfilled and 0.5 wt % FGS-SE nanocomposite.

To understand the effect of FGS on the tensile properties of SE, movies of the tearing process of unfilled and FGS-filled SE in an SEM were recorded to reveal the failure mechanisms. Snapshots of the movies are shown in Error! Reference source not found.A-4F. As shown in FIG. 4A, when the unfilled SE was deformed, the notch gradually opened up. Until a certain level of stress was reached, tearing was initiated from the tip of the notch due to stress concentration and it immediately propagated across the specimen with little resistance, leading to the failure of the specimen. Due to its lack of ability to crystallize under strain, SE does not possess mechanism to arrest or deflect tearing and transfer the mechanical load to other parts of the matrix that is not sampled mechanically. When percolated FGS network was introduced, the failure mechanism of SE was altered dramatically. At the initial stage of the deformation of 0.5 wt. % FGS-SE, the notch opened up (FIG. 4B). At a certain stress level, tearing was initiated from the tip of the notch. However, unlike the case of the unfilled SE, tear propagation was resisted and the sample did not fail upon tear initiation (FIG. 4C). The percolated FGS network introduced resistance for tear propagation. Upon further deformation, tear was further opened, followed by the catastrophic failure of the sample (FIG. 4D). The observations above clearly illustrated the enhanced tear resistance in SE introduced by the percolated FGS network.

SEM was also used to characterize the tensile-fractured surface of unfilled and FGS-filled. For the unfilled SE (FIG. 4E), a few ridges were observed and majority of the torn surface was smooth, indicating that once tearing was initiated, it propagated across the entire sample with little resistance or distortion. The fractured surface of 0.5 wt. % FGS-SE is shown in FIG. 4F. The bright spots with submicron length scales were the FGS. The morphology of the failure surface was quite different from that of the unfilled SE. The torn surface had more ridges than the unfilled SE, indicating the distortion of tear propagation by the presence of percolated FGS.

To quantify the degree of tearing in the unfilled and FGS-filled SE, mechanical hysteresis measurement was undertaken. Hysteresis loss in filled rubber has been attributed to covalent bond rupturing in the matrix,[64] viscoelasticity[65] and the breakdown of the filler network structure[66]. While viscoelasticity induced hysteresis loss is recoverable, covalent bond rupturing and the breakdown of filler network structure can lead to irrecoverable hysteresis loss. Given the nature of FGS-FGS interaction to be weak van der Waals' force, the contribution of FGS network breakdown to irrecoverable hysteresis loss in FGS-SE is likely to be small. Therefore, measurements of irrecoverable hysteresis loss provide a method to quantify the degree of tearing in unfilled and FGS-filled SE.

[64] Suzuki, N.; Ito, M.; Yatsuyanagi, F. *Polymer* 2005, 46, (1), 193-201
[65] Roland, C. M. *Rubber Chemistry and Technology* 1989, 62, (5), 880-895
[66] Yamaguchi, K.; Busfield, J. J. C.; Thomas, A. G. *Journal of Polymer Science Part B-Polymer Physics* 2003, 41, (17), 2079-2089

The mechanical hysteresis data is shown in Error! Reference source not found. Unfilled SE showed little irrecoverable hysteresis loss after recovery as evidenced by the overlapping of the stress-strain curves of first stretch and the stretch after recovery (Error! Reference source not found.), suggesting few covalent bonds rupturing in the matrix. The 0.5 wt. % FGS-SE sample showed an observable difference in the two stress-strain curves and a higher irrecoverable hysteresis loss compared to the unfilled SE, as shown in Error! Reference source not found. The irrecoverable hysteresis loss ratio is determined to be 5.5%. The above results suggest a higher degree of covalent bond rupturing in the matrix caused by the presence of FGS, confirming the introduction of distributed deformation by adding FGS.

Based on the above evidence, the reinforcement mechanism of SE by FGS can be envisioned. To improve the failure properties of SE, a mechanism to arrest or distort the tearing initiated from the intrinsic defects is necessary. The arresting or distortion of tearing could only be achieved when the length scale of the filler was much larger than the length scale of the initial tear size, which is determined by the size of intrinsic defects. An individual FGS has a lateral size of hundreds of nanometers, much smaller than the intrinsic defect size in elastomers.[44,45] Therefore, only percolated FGS network leads to a simultaneous increase in tensile strength and elongation at break of SE. During deformation of the nanocomposite, tearing is initiated from the intrinsic flaws in the matrix and arrested or deflected by the presence of percolated FGS. The arresting or deflection leads to load transferring to the FGS and other parts of the unstrained matrix, leading to the enhancement of tensile strength. Deformation and tearing are also distributed across a larger portion of the matrix compared to unfilled SE and the opening of tears causes dilation within the matrix, leading to the observed elongation at break increase.

[44] Choi, I. S.; Roland, C. M. *Rubber Chemistry And Technology* 1996, 69, (4), 591-599

[45] Hamed, G. R. *Rubber Chemistry And Technology* 1983, 56, (1), 244-251

The necessity of a percolated FGS network to improve mechanical properties shown here is in sharp contrast to previous studies of multiwall carbon nanotube (MWNT) and carbon black (CB) filled SBR in which the increase in strength and elongation at break occurred prior to electrical percolation.[67,68] The MWNT was shown to have length up to 5 μm, whereas CB can form agglomerates up to hundreds of microns.[69] Agglomeration of those fillers can readily achieve a length-scale that is larger than the critical flaw size and improves the tensile properties.

[67] Bokobza, L. *Polymer* 2007, 48, (17), 4907-4920
[68] Reffaee, A. S. A.; El Nashar, D. E.; Abd-El-Messieh, S. L.; Nour, K. *Polymer-Plastics Technology and Engineering* 2007, 46, (6), 591-603
[69] Kohjiya, S.; Kato, A.; Ikeda, Y. *Progress in Polymer Science* 2008, 33, (10), 979-997

Figures 6A, 6B, 6C, 6D:
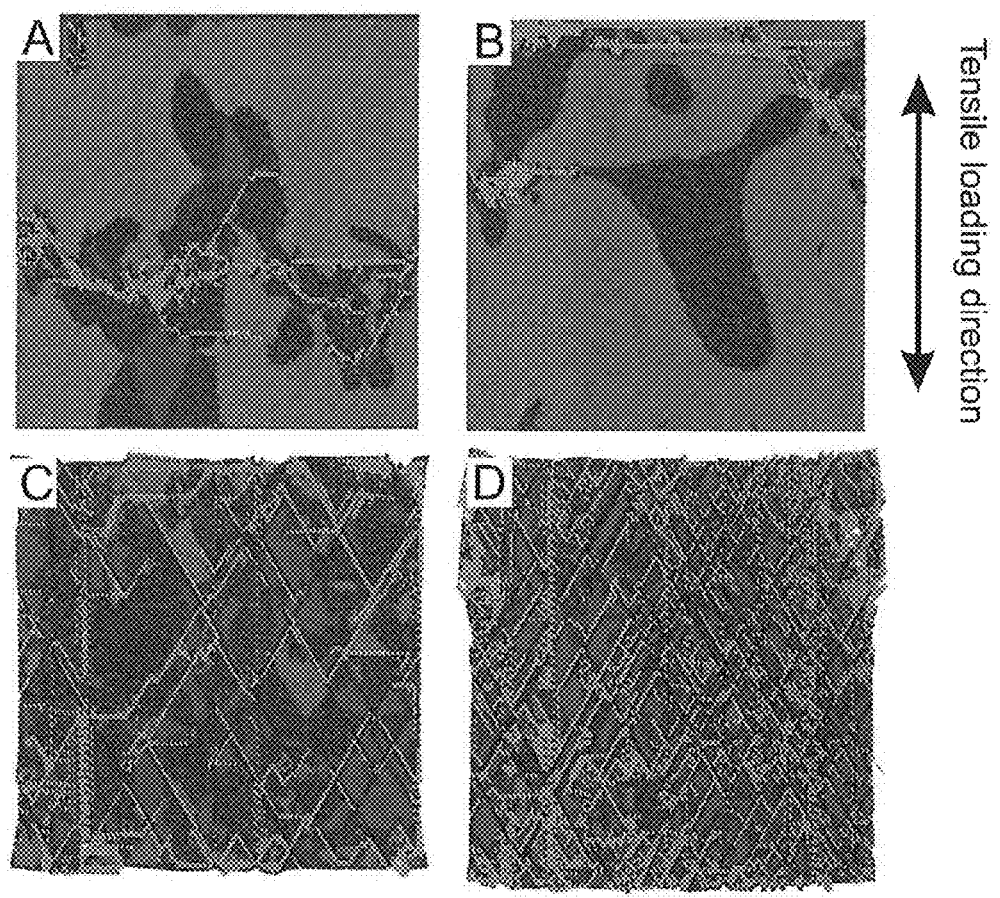
FIGS. 6A-6D provide images of the deformed lattice in unfilled and FGS-SE nanocomposites.
Figures 7A, 7B, 7C:
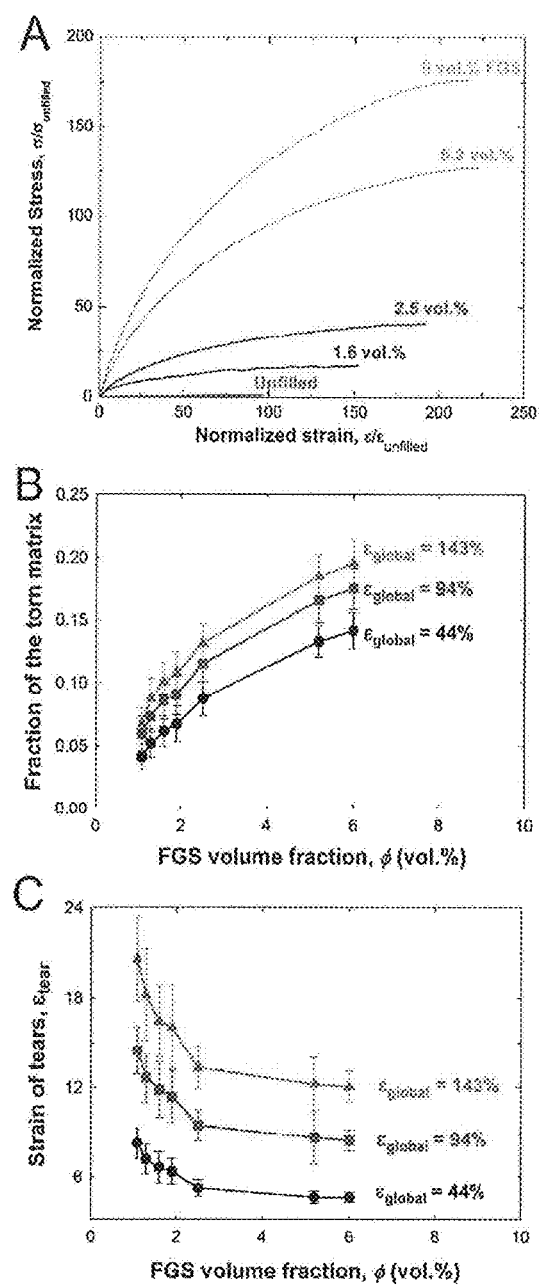
FIGS. 7A-7C provide graphical representations of (7A). Simulated normalized stress-strain curves of unfilled and FGS-filled SE; (7B). Fraction of the matrix torn versus FGS vol. % at three different strains; and (7C). Average strain of tears versus FGS vol. %.

3.4 Modeling of mechanical reinforcement in graphene-SE nanocomposite To corroborate with the reinforcement mechanism demonstrated above and more importantly, to understand the reversal in elongation at break, a lattice-based model is used to study the deformation mechanics of FGS-SE nanocomposite.[43] The deformed lattice with or without FGS is shown in Error! Reference source not found.A-6D. Individual FGS or percolated FGS was represented by the black lines. The torn matrix was represented by green regions. In the unfilled SE, tearing was initiated from the defects and propagated across the sample without much resistance due to the lack of tear arresting mechanism (FIG. 6A). As shown in FIG. 6B, when individual unpercolated FGSs were present outside of the defects, tearing was initiated from the intrinsic defects and propagated across the sample undeterred as in the case of unfilled SE. No interaction between FGS and tears was observed and failure properties of SE were therefore not improved. When FGS was percolated, the percolated network had a length scale much larger than the intrinsic defect size. When 1.6 vol. % percolated FGS was added, tearing was initiated and distorted or arrested by the presence of percolated FGS (FIG. 6C). Through arresting or distorting of tearing, deformation was distributed to the stronger parts of the matrix as evidenced by the distributed tearing. When FGS concentration was increased to 5.2 vol. %, a higher degree of distributed deformation can be achieved as indicated by the increased amount of torn matrix (FIG. 6D).

[43] Sanborn, S. E.; Pan, S.; Prevost, J. H.; Aksay, I. A. *Submitted to Macromolecules*

The simulated and normalized stress-strain curves of unfilled and FGS-filled SE are shown in Error! Reference source not found.A-7C. The termination of the stress-strain curve indicated the strain at the peak stress level. Peak stress was defined as the tensile strength of the sample and the strain at the peak strength was defined as the elongation at break. The simulation reproduced qualitatively the experimental stress-strain curves of unfilled and FGS-filled FGS. The modulus and strength increased with FGS concentration whereas the elongation at break increased initially and decreased above 5.2 vol. %.

Analysis of the mechanical load carried by FGS demonstrated the excellent load carrying capacity of percolated FGS.[43] Through arresting or distorting of tearing, mechanical load was transferred to the FGS and stronger parts of the matrix, leading to a significant increase in the tensile strength of the composite. The most interesting observation was the increase in the elongation at break of SE. To gain more insight into the mechanism responsible for the elongation at break increase, we studied the fraction of matrix torn and the strain of tears as a function of FGS concentration. The fraction of matrix torn increased with FGS concentration, suggesting an increasing degree of distributed deformation. The strain of tears decreased with FGS concentration, due to the close proximity of percolated FGS suppressing the opening of tears. The increase in elongation at break with FGS concentration can be explained by the dilation effect of tearing. As tear opened up during straining of the sample, the sample could be elongated more. Our model showed that the elongation at break of the nanocomposite was dominated by two factors: the fraction of matrix torn and the strain of tears. When the FGS concentration was increased, the two factors were competing with each other and the reversal effect on the elongation at break with increasing FGS concentration was a result of the domination of decreasing strain of tears over increasing fraction of matrix torn.

[43] Sanborn, S. E.; Pan, S.; Prevost, J. H.; Aksay, I. A. *Submitted to Macromolecules*

The elongation at break increase can also be influenced by other factors such as the strain and deformability of the untorn matrix. However, those effects cannot be investigated due to the technical limitation of the model.

To demonstrate the superiority of FGS at improving the mechanical properties of SE, modulus, tensile strength and their relative improvement of all filled PDMS-based SE were plotted against the filler volume fraction for the concentration range studied in the present study (Error! Reference source not found.A-8B and Error! Reference source not found.A-9B). Only studies that used pristine SE (containing no fillers) as the base polymer were chosen for the analysis. For each type of filler, the sets of data with the largest improvement in mechanical properties were chosen for comparison.

To compare the modulus enhancement brought by FGS to that by other fillers, the modulus and improvement in modulus (calculated by dividing the difference in modulus between the filled and unfilled samples by the modulus of the unfilled sample) were plotted against filler volume percentage in Error! Reference source not found.A-8B. In terms of the relative improvement of the modulus, FGS is comparable to or better than all the reported fillers except for MWNT. One thing needs to be noted is that the unfilled SE in that MWNT-SE study had a modulus of 0.14 MPa, almost an order of magnitude lower than that of the unfilled SE used in the present invention.[17] The superiority of FGS at enhancing modulus can be attributed to the high aspect ratio plate-like geometry and the high surface area (higher than all the fillers reported in previous studies) which enabled the low percolation threshold and offered extensive interfacial interactions with the matrix and a higher degree of load transferring.

[17] Bokobza, L.; Rahmani, M. *Kgk-Kautschuk Gummi Kunststoffe* 2009, 62, (3), 112-117

The strength and the improvement in strength of the FGS-SE nanocomposite were compared with those of other filled-SE as a function of filler volume percentage, shown in Error! Reference source not found.A-9B. In terms of the relative improvement in strength, FGS performed comparably or better than all other fillers except for MWNT. In the case of fumed silica and precipitated silica, which yielded similar strength improvement as FGS, the unfilled SE in that study had a tensile strength of 0.075 MPa,[15] much lower than that of the unfilled SE in the present study (0.57 MPa). FGS-SE also has the highest tensile strengths in the concentration range studied. The superior ability of FGS to strengthen the matrix is believed to be attributed to: 1. its plate-like geometry, high aspect ratio and surface area, which provide a low percolation threshold and large load transferring; 2. The distributed deformation introduced by the percolated FGS allowed more regions of the SE matrix to carry loads.

[15] Yuan, Q. W.; Mark, J. E. *Macromolecular Chemistry And Physics* 1999, 200, (1), 206-220

3.4 Barrier properties of FGS-SE Nanocomposite. The multi-functionality of FGS as a filler lies in its ability to simultaneously improve the mechanical and electrical as well as the barrier properties of SE.

Oxygen and nitrogen permeabilities of unfilled and FGS-filled SE were measured and the results are shown in Table 2.

TABLE 2

Oxygen and nitrogen permeability of unfilled and FGS-filled SE. Permeability was reduced by half with 3 wt. % (1.31 vol. %) FGS.

| Sample | Permeability (Barrier) | |
|---|---|---|
| | $O_2$ | $N_2$ |
| Unfilled SE | 555 | 266 |
| 1 wt. % (0.43 vol. %) FGS | 514 | 249 |
| 3 wt. % (1.31 vol. %) FGS | 283 | 137 |

With the incorporation of 1 wt. % (0.43 vol. %) FGS, permeability for both gases was reduced by 7%. When 3 wt. % (1.31 vol. %) FGS was added, permeability was reduced by half. The improvement was better than that in the clay-filled SE.[18]

[18] LeBaron, P. C.; Pinnavaia, T. J. *Chemistry Of Materials* 2001, 13, (10), 3760-3765

The reduction in gas permeability is believed to be attributed to the presence of FGS acting as impermeable barrier and increasing the diffusion path for the gas.[70] Additionally, it has been suggested that due to the large interfacial area in the nanocomposites, the properties of the matrix, such as the fraction free volume, can be reduced and further decrease in the permeability can be achieved.[71] PDMS can form hydrogen bonding with hydroxyl groups and the interaction between PDMS and FGS provides a modification of the matrix permeability and therefore the overall barrier property of the nanocomposite.

[70] Nielsen, L. E. *Journal of Macromolecular Science* 1967, A1, (5), 929-942
[71] Wang, Z. F.; Wang, B.; N.; Zhang, H. F.; Zhang, L. Q. *Polymer* 2005, 46, (3), 719-724

Obviously, numerous modifications and variations of the present invention are possible in light of the above teachings. It is therefore to be understood that within the scope of the appended claims, the invention may be practiced otherwise than as specifically described herein.

The invention claimed is:

1. A method for production of a nanocomposite composition comprising a silicone elastomer matrix and functionalized graphene sheets having a surface area of from 300 m²/g to 2,630 m²/g, comprising:
dispersing functional graphene sheets (FGS) in a polar solvent to form an FGS suspension;
combining the FGS suspension with a vinyl terminated polysiloxane;
removing the polar solvent;
combining the resulting mixture with a crosslinker and a hydrosilylation catalyst;
curing the resulting mixture to provide the nanocomposite;
wherein the functional graphene sheets have a loading of greater than 0.05 wt % based on total nanocomposite weight;
wherein the hydrosilylation catalyst is present at a concentration of about 367 ppm to about 5600 ppm;
wherein the nanocomposite comprises a silicon hydride to vinyl molar ratio of about 1.5 to about 2.1; and
wherein the functional graphene sheets are present within the nanocomposite in a continuous three-dimensional connected network in a manner wherein individual functional graphene sheets have nanometer scale separation at contact point between individual functional graphene sheets.

2. The method of claim 1, wherein the curing is performed at elevated temperature for a period of time from 1 to 48 hours.

3. The method of claim 2, wherein the curing temperature is about 100° C.

4. The method of claim 2, wherein the curing is performed for a period of time from 5 to 30 hours, 20 to 25 hours, or approximately 24 hours.

5. The method of claim 4, wherein the curing is performed for a period of time of approximately 24 hours.

6. The method of claim 1, wherein the functional graphene sheets have a loading of from 0.5 to 3 wt %, based on total nanocomposite weight.

7. The method of claim 1, wherein the silane cross-linker is a member selected from the group consisting of tetrakis (dialkylsiloxy)silanes and poly(hydromethyl siloxane) crosslinkers.

8. The method of claim 1, wherein the silane cross-linker is a tetrakis(dimethylsiloxy)silane.

9. The method of claim 1, wherein the vinyl-terminated polysiloxane has a viscosity of from 100 to 300,000 mPas.

10. An article formed from a nanocomposite produced by the method of claim 1.

11. The article of claim 10, wherein the article is formed by casting.

12. The article of claim 10, wherein the article is formed by molding.

13. The article of claim 10, wherein the article is a member selected from the group consisting of coatings, adhesives, sealants, flexible electrodes, actuators, pressure sensors, printed circuits, and electromagnetic interference shielding materials.

14. The method of claim 1, wherein the hydrosilylation catalyst is present at a concentration of about 1,280 ppm.

15. The method of claim 1, wherein the hydrosilylation catalyst is present at a concentration of about 5,600 ppm.

16. A method for production of a nanocomposite composition comprising a silicone elastomer matrix and functionalized graphene sheets having a surface area of from 300 m²/g to 2,630 m²/g, comprising:
dispersing functional graphene sheets (FGS) in a polar solvent to form an FGS suspension;
combining the FGS suspension with a vinyl terminated polysiloxane having a viscosity of from 100 to 300,000 mPas;
removing the polar solvent;
combining the resulting mixture with a crosslinker and a hydrosilylation catalysts, wherein the silane cross-linker is a member selected from the group consisting of tetrakis(dialkylsiloxy)silanes and poly(hydromethyl siloxane) crosslinkers, and wherein the hydrosilylation catalyst is a member selected from the group consisting of chloroplantinic acid, elementary platinum, solid platinum supported on a carrier; platinum-vinylsiloxane complexes; platinum-phosphine complexes; platinum-phosphite complexes; Pt (acac)$_2$, wherein (acac) represents acetylacetonate group; platinum-hydrocarbon conjugates; platinum alcoholates; RhCl(PPh$_3$)$_3$; RhCl$_3$; Rh/Al$_2$O$_3$; RuCl$_3$; IrCl$_3$; FeCl$_3$; AlCl$_3$; PdCl$_2$.2H$_2$O; NiCl$_2$; and TiCl$_4$; and curing the resulting mixture to provide the nanocomposite, wherein the curing is performed at elevated temperature for a period of time from 1 to 48 hours;

wherein the functional graphene sheets have a loading of greater than 0.05 wt % based on total nanocomposite weight;

wherein the hydrosilylation catalyst is present at a concentration of about 367 ppm to about 5600 ppm;

wherein the nanocomposite comprises a silicon hydride to vinyl molar ratio of about 1.5 to about 2.1; and wherein the functional graphene sheets are present within the nanocomposite in a continuous three-dimensional connected network in a manner wherein individual functional graphene sheets have nanometer scale separation at contact points between individual functional graphene sheets.

17. The method of claim 16, wherein the hydrosilylation catalyst is present at a concentration of about 367 ppm.

18. The method of claim 16, wherein the hydrosilylation catalyst is present at a concentration of about 1,000 ppm.

19. The method of claim 16, wherein the hydrosilylation catalyst is present at a concentration of about 1,280 ppm.

20. The method of claim 16, wherein the hydrosilylation catalyst is present at a concentration of about 5,600 ppm.

* * * * *